US010182951B2

(12) United States Patent
Bourgraf et al.

(10) Patent No.: US 10,182,951 B2
(45) Date of Patent: Jan. 22, 2019

(54) EMERGENCY VEHICLE PATIENT TRANSPORT SYSTEMS

(71) Applicant: FERNO-WASHINGTON, INC., Wilmington, OH (US)

(72) Inventors: Joseph G. Bourgraf, Maineville, OH (US); Timothy Robert Wells, Hillsboro, OH (US); Timothy Paul Schroeder, Mason, OH (US)

(73) Assignee: Ferno-Washington, Inc., Wilmington, OH (US)

( * ) Notice: Subject to any disclaimer, the term of this patent is extended or adjusted under 35 U.S.C. 154(b) by 0 days.

(21) Appl. No.: 15/193,331

(22) Filed: Jun. 27, 2016

(65) Prior Publication Data

US 2016/0304007 A1   Oct. 20, 2016

Related U.S. Application Data

(60) Continuation of application No. 15/045,672, filed on Feb. 17, 2016, which is a continuation of application
(Continued)

(51) Int. Cl.
*A61G 3/00* (2006.01)
*A61G 1/02* (2006.01)
(Continued)

(52) U.S. Cl.
CPC .............. *A61G 3/003* (2013.01); *A61G 1/02* (2013.01); *A61G 1/06* (2013.01); *A61G 3/001* (2013.01);
(Continued)

(58) Field of Classification Search
CPC ...... A61G 3/003; A61G 3/005; A61G 3/0209; A61G 3/0218; A61G 3/029; A61G 3/0816;
(Continued)

(56) References Cited

U.S. PATENT DOCUMENTS 3,922,029 A   11/1975   Urai
4,555,138 A   11/1985   Hughes
(Continued)

FOREIGN PATENT DOCUMENTS

CN     201300753        9/2009
DE     19607899 A1      9/1997
(Continued)

OTHER PUBLICATIONS

Japanese Office Action dated Feb. 8, 2016 for Japanese Application No. 2015-089123 filed Apr. 25, 2011 entitled "Emergency Vehicle Patient Transport Systems"—Translation.
(Continued)

*Primary Examiner* — Jason S Daniels
(74) *Attorney, Agent, or Firm* — Dinsmore & Shohl, LLP

(57) ABSTRACT

Emergency vehicle patient transport systems are disclosed. In one embodiment, an emergency vehicle patient transport system includes: a loading passage providing access to an interior of an emergency vehicle; one or more tracks coupled to a floor of the emergency vehicle, a ceiling of the emergency vehicle, a wall of the emergency vehicle or combinations thereof wherein, a travel path is delineated by the one or more tracks; and a chair slidingly engaged with the one or more tracks, and vertically positioned between the floor and the ceiling. The chair locks in one or more set positions. And, the one or more set positions are selected from a group consisting of an airway care position, an extended airway care position, a procedural care position, a responder position, a patient care position, and a patient load position.

11 Claims, 19 Drawing Sheets

Related U.S. Application Data

No. 14/642,954, filed on Mar. 10, 2015, now Pat. No. 9,295,595, which is a continuation of application No. 14/085,883, filed on Nov. 21, 2013, now Pat. No. 9,027,978, which is a continuation of application No. 13/741,870, filed on Jan. 15, 2013, now Pat. No. 8,616,604, which is a division of application No. 12/767,555, filed on Apr. 26, 2010, now Pat. No. 8,382,181.

(51) Int. Cl.
    *A61G 1/06*     (2006.01)
    *A61G 3/02*     (2006.01)
    *A61G 3/08*     (2006.01)
    *B60N 2/07*     (2006.01)
    *B60N 2/12*     (2006.01)

(52) U.S. Cl.
    CPC .............. *A61G 3/02* (2013.01); *A61G 3/0218* (2013.01); *A61G 3/0816* (2013.01); *B60N 2/0742* (2013.01); *B60N 2/12* (2013.01); *A61G 2203/723* (2013.01)

(58) Field of Classification Search
    CPC ........ A61G 3/0866; B60N 2/005; B60N 2/02; B60N 2/0292; B60N 2/04; B60N 2/12; B60N 2/24; B60N 2/32; B60N 2/34
    USPC ........ 296/19, 64, 65.01, 65.13, 69; 297/233, 297/234, 344.1
    See application file for complete search history.

(56) References Cited

U.S. PATENT DOCUMENTS

| | | | |
|---|---|---|---|
| 4,925,211 | A | 5/1990 | Whittaker et al. |
| 5,120,103 | A | 6/1992 | Kave |
| 5,544,363 | A | 8/1996 | McCue et al. |
| 5,632,521 | A | 5/1997 | Archambault et al. |
| 6,123,392 | A | 9/2000 | Alfred et al. |
| 6,152,401 | A | 11/2000 | Green |
| 6,224,154 | B1 | 5/2001 | Stoki |
| 6,793,281 | B2 | 9/2004 | Duerr et al. |
| 6,896,291 | B1 | 5/2005 | Peterson |
| 7,112,022 | B1 | 9/2006 | McLoughlin et al. |
| 7,521,891 | B2 | 4/2009 | Choy et al. |
| 7,621,580 | B2 | 11/2009 | Randjelovic et al. |
| 7,637,550 | B2 | 12/2009 | Menna |
| 2001/0002087 | A1 | 5/2001 | Townsend |
| 2004/0074414 | A1 | 4/2004 | Phillips |
| 2007/0158969 | A1 | 7/2007 | Walkingshaw |
| 2008/0023976 | A1 | 1/2008 | Myers et al. |
| 2008/0290679 | A1 | 11/2008 | Lambarth et al. |
| 2009/0255058 | A1 | 10/2009 | Chinn |
| 2010/0045059 | A1 | 2/2010 | Bourgraf et al. |

FOREIGN PATENT DOCUMENTS

| | | |
|---|---|---|
| DE | 100022933 A1 | 5/2000 |
| DE | 102008007415 A1 | 2/2008 |
| FR | 2226299 A1 | 11/1974 |
| FR | 002493142 A1 | 10/1980 |
| FR | 2635735 A1 | 3/1990 |
| GB | 1193859 | 6/1970 |
| JP | 49-128420 A | 12/1974 |
| JP | 2-141439 A | 11/1990 |
| JP | 6-169952 A | 6/1994 |
| JP | 08-000669 | 9/1996 |
| JP | 2000177664 A | 6/2000 |
| JP | 2003-126184 A | 5/2003 |
| JP | 2004-361288 A | 12/2004 |
| WO | 9927881 A1 | 6/1999 |
| WO | 2008019389 A2 | 2/2008 |

OTHER PUBLICATIONS

Road Safety: Technical Specs Product: RS-3000 Vehicle Systems; accessed Mar. 17, 2010; http://www.roadsafety.com/ev_techspecs.php.
International Search Report and Written Opinion pertaining to Application No. PCT/US2011/033748 with a filing date of Aug. 1, 2011.
International Preliminary Report on Patentability pertaining to Application No. PCT/US2011/033748 with a filing date of Aug. 1, 2011.
Patent Examination Report No. 1 dated Dec. 5, 2013 pertaining to Australian Patent Application No. 2011245502.
U.S. Non-Final Office Action dated Jan. 27, 2017 pertaining to U.S. Appl. No. 15/045,672, 56 pages.
U.S. Final Office Action dated May 15, 2017 pertaining to U.S. Appl. No. 15/045,672, 39 pages.
Ambulance Crash-Related Injuries Among Emergency Medical Services Workers—United States, 1001-2002; MMWWR, Weekly, Feb. 28, 2003 / 52(08); 154-156; Feb. 27, 2003.
Russian Office Action dated Jul. 3, 2015 pertaining to Russian Patent Application No. 2012150396 "Emergency Vehicle Patient Transport Systems" for Femo-Washington, Inc.
Chinese Office Action dated Aug. 27, 2015 pertaining to Chinese Patent Application No. 201180027508.5 "Emergency Vehicle Patient Transport Systems" for Ferno-Washington, Inc.
Japanese Office Action dated Mar. 28, 2018 pertaining to Japanese Application No. 2017-084114 filed Apr. 25, 2011 entitled "Emergency Vehicle Patient Transport Systems"—English Translation.

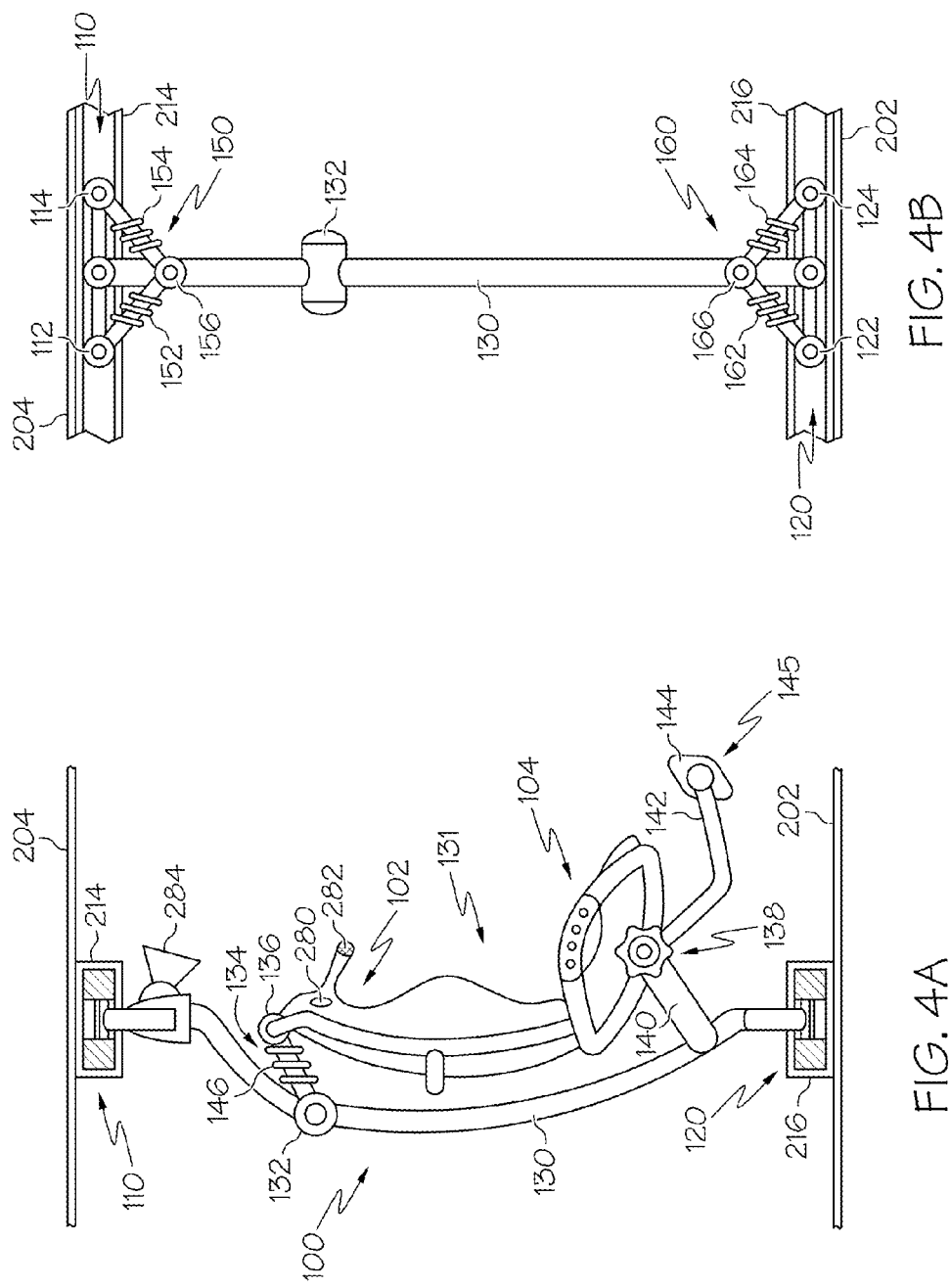

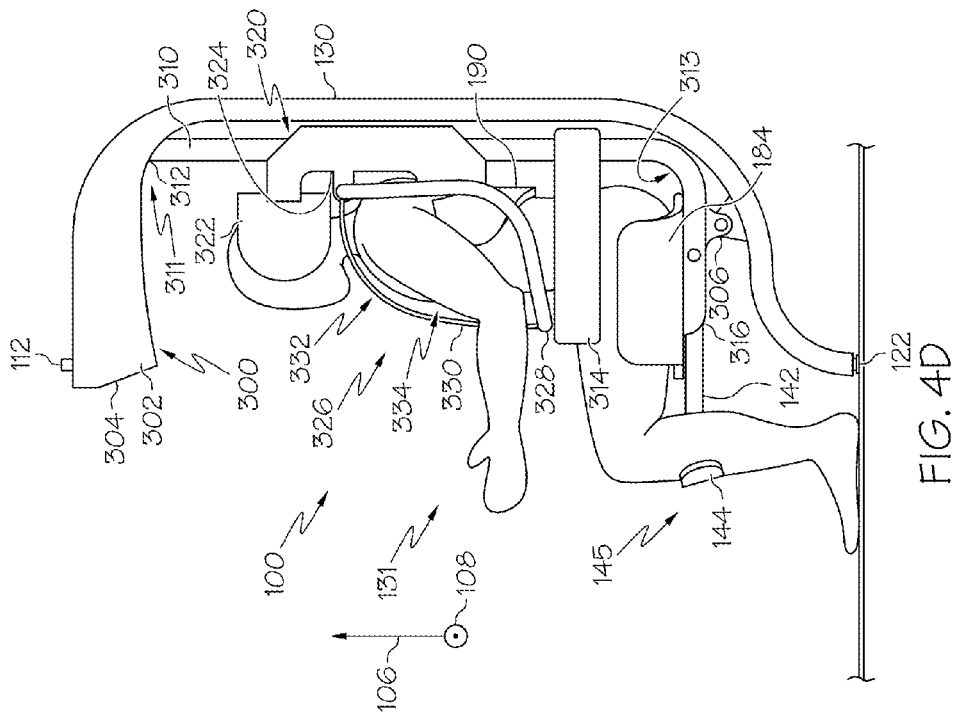
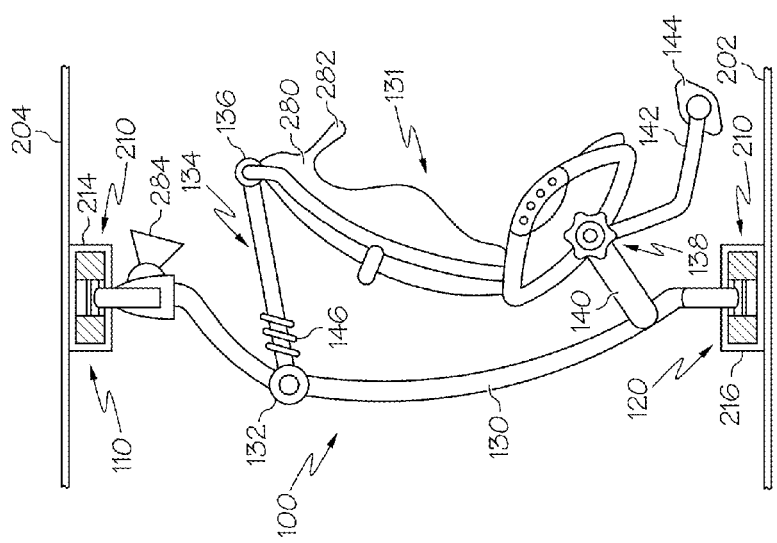
FIG. 4D
FIG. 4C

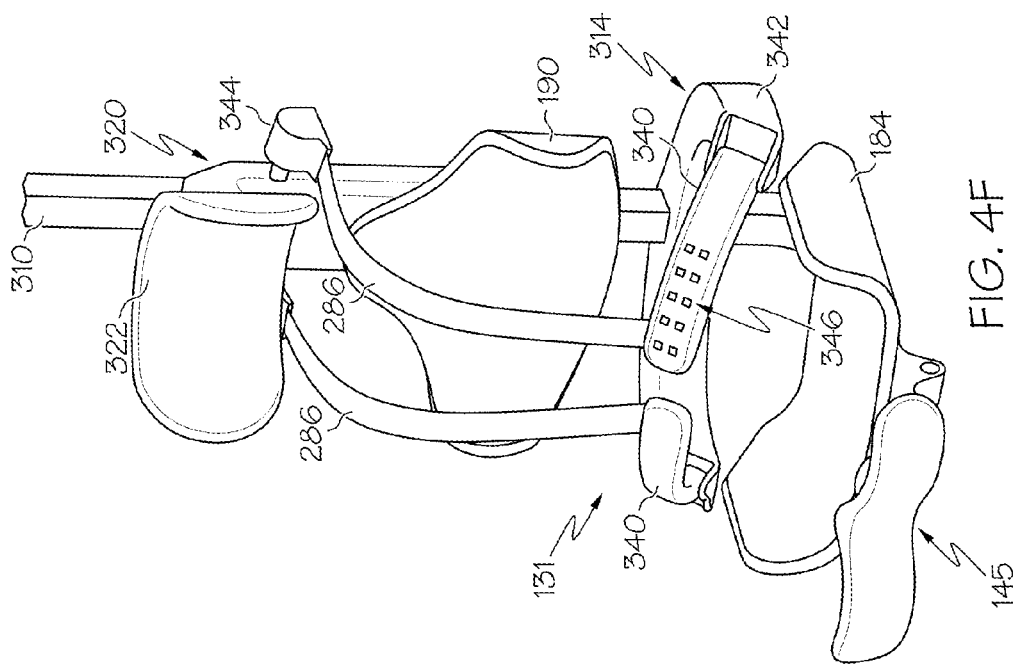
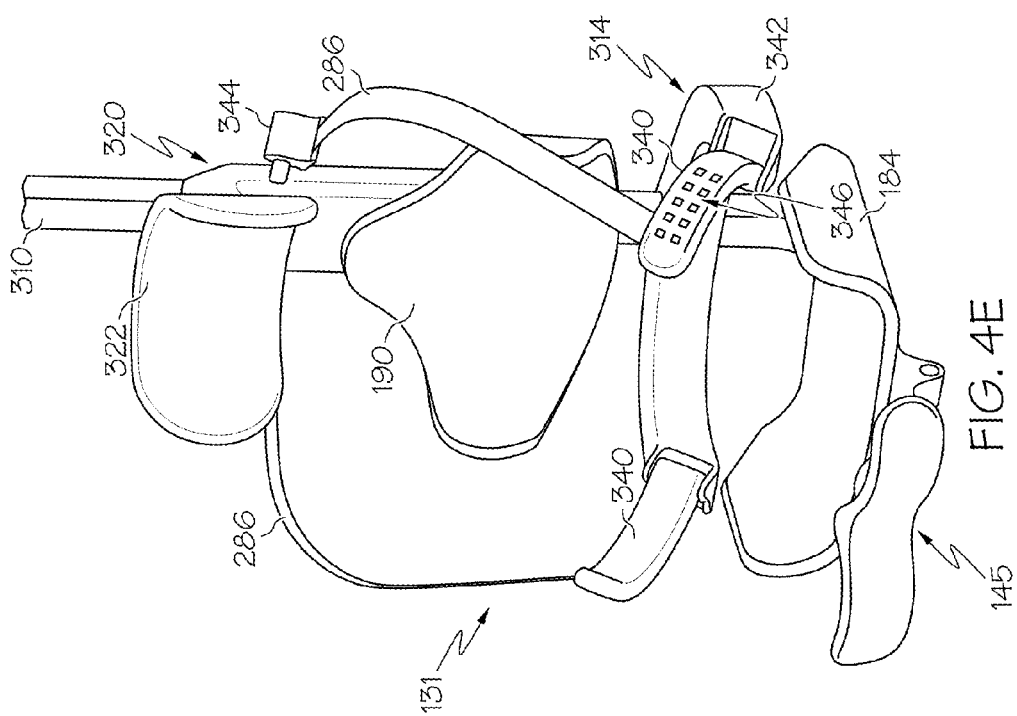

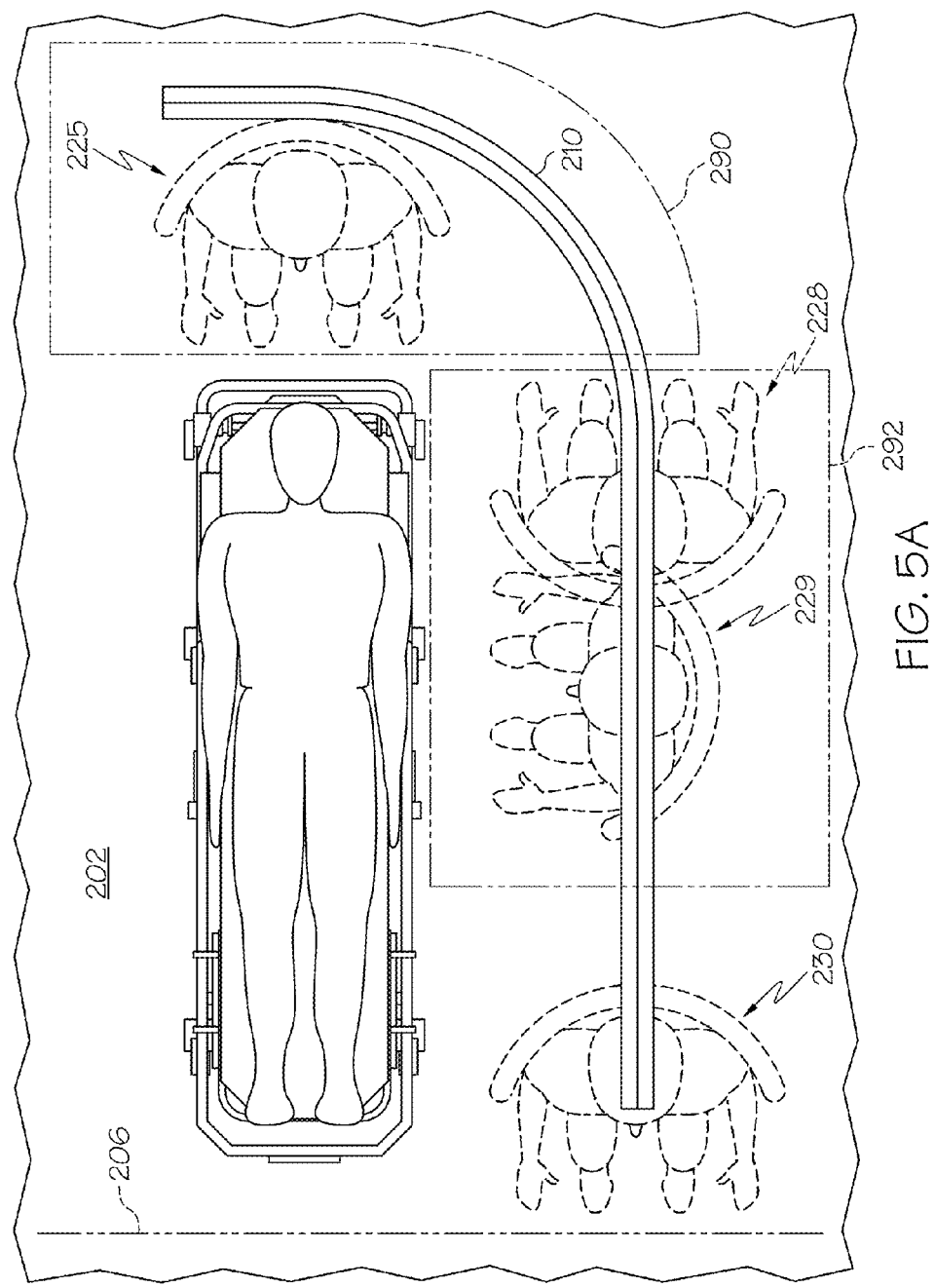

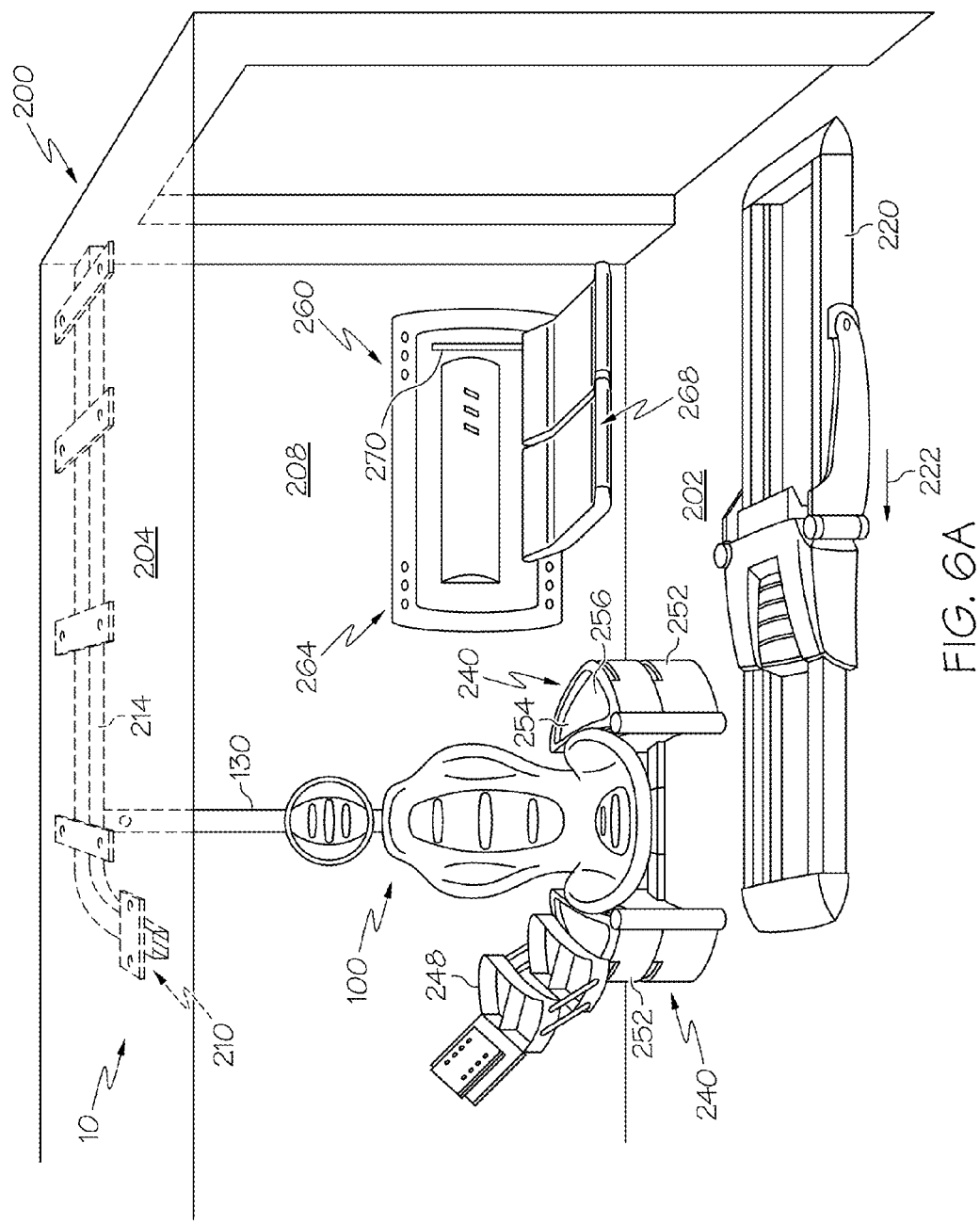

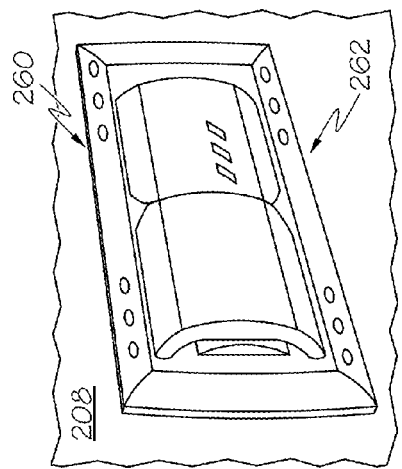
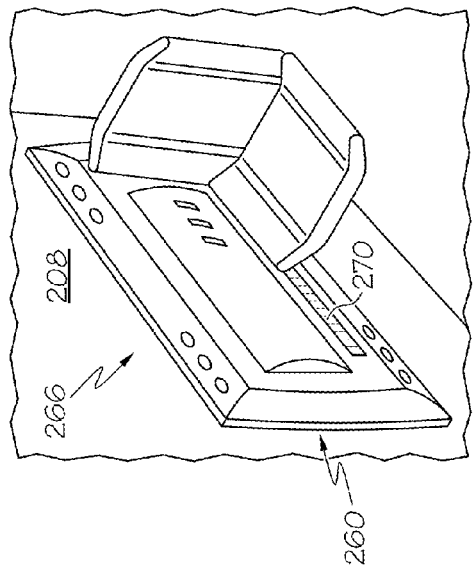
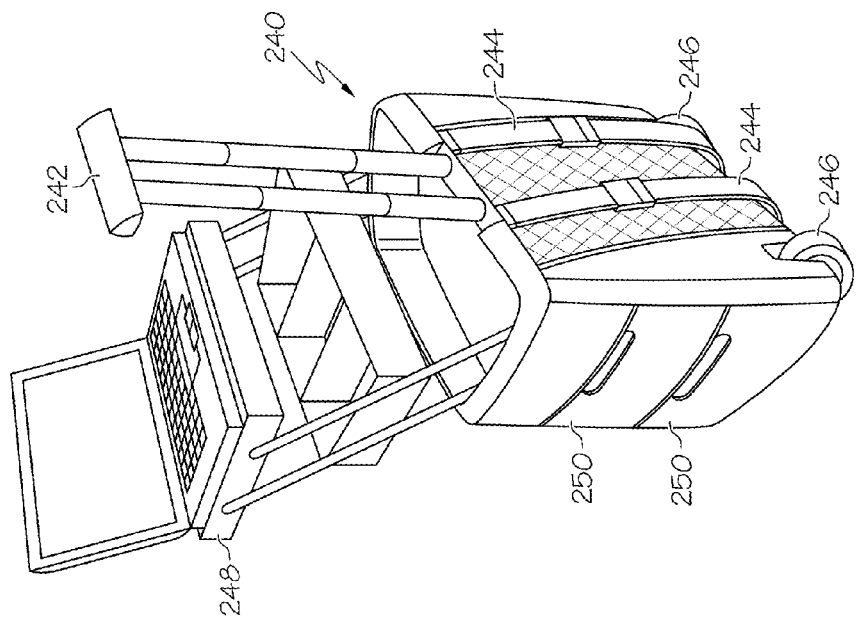

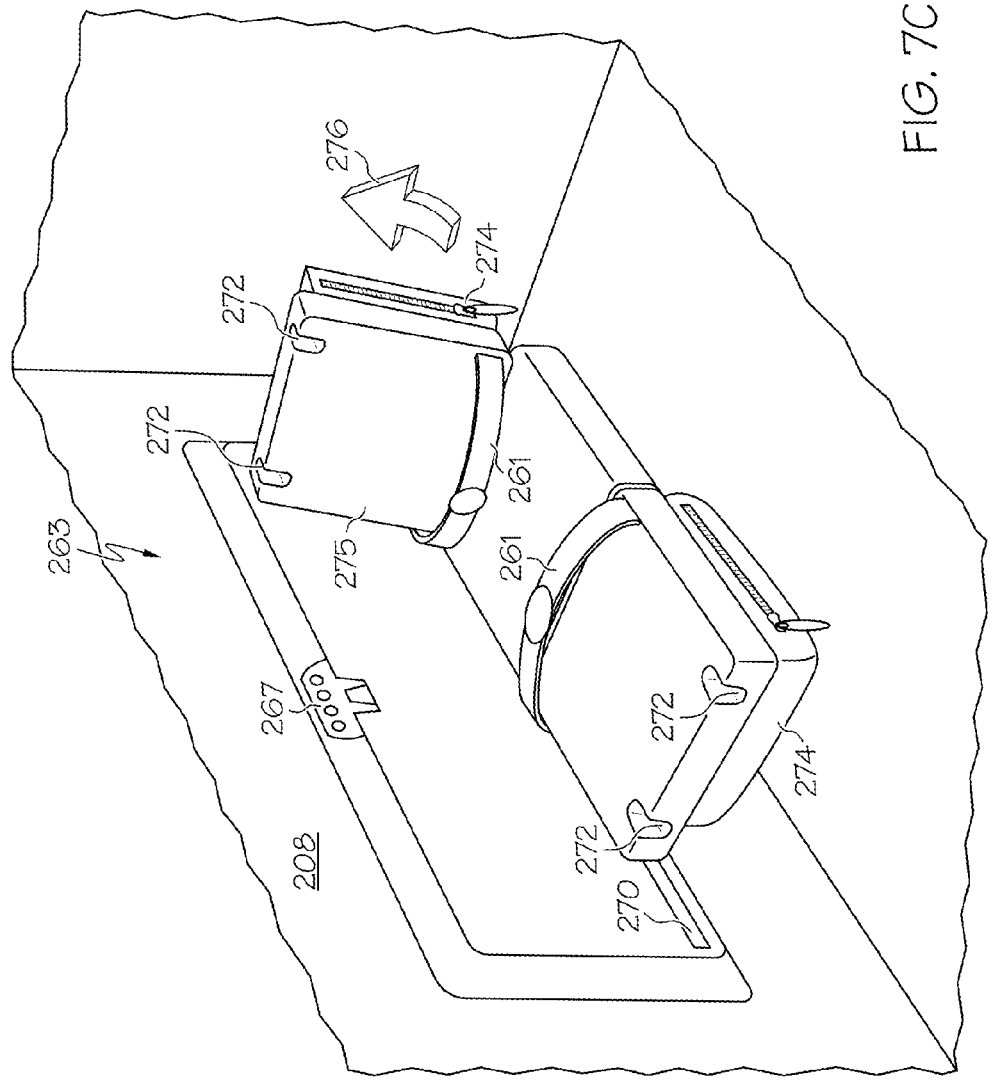

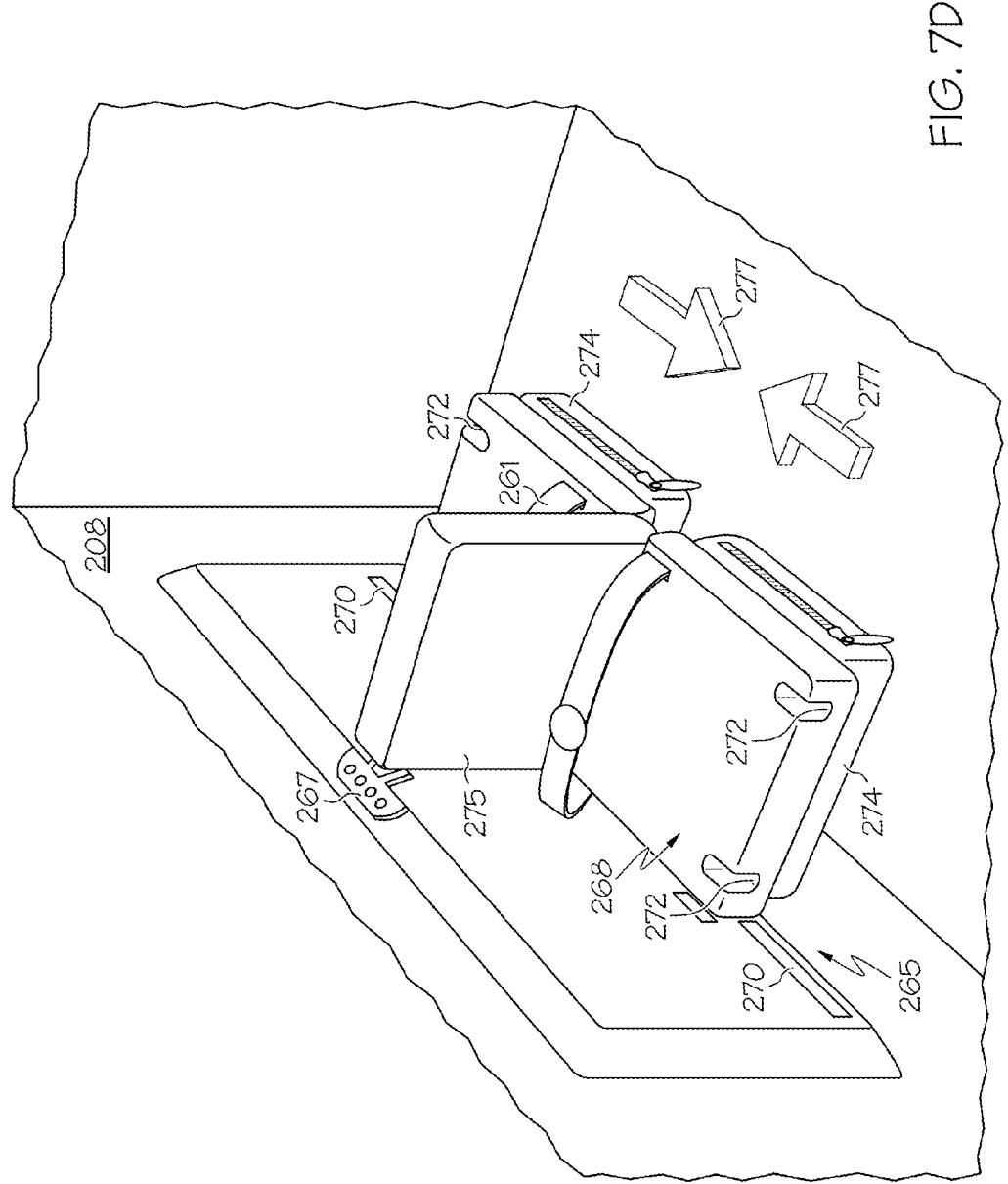

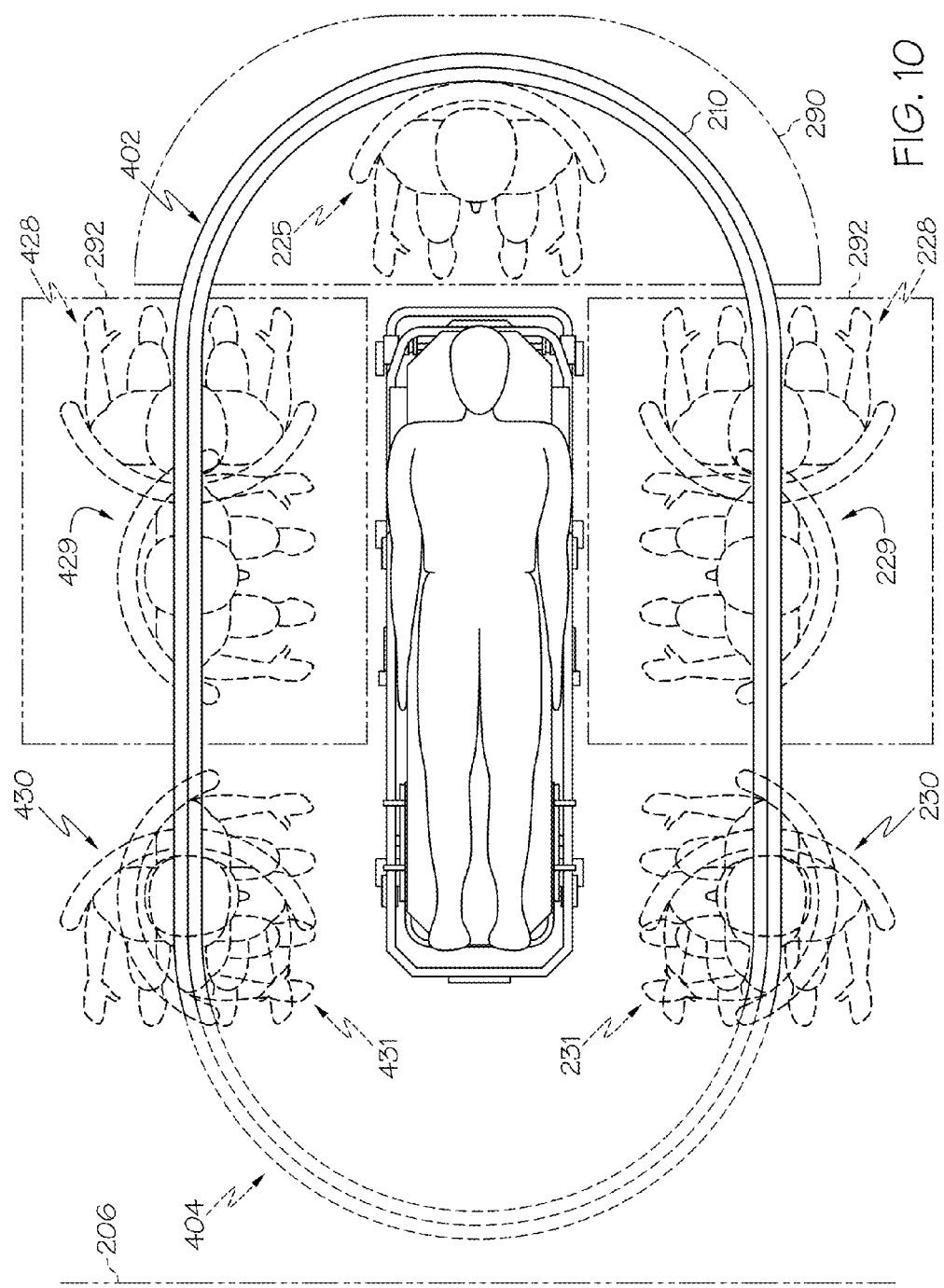

EMERGENCY VEHICLE PATIENT TRANSPORT SYSTEMS

CROSS-REFERENCE TO RELATED APPLICATION

This application is a continuation of U.S. patent application Ser. No. 15/045,672 filed on Feb. 17, 2016, which is a continuation of U.S. patent application Ser. No. 14/642,954, filed on Mar. 10, 2015, which is a continuation of U.S. patent application Ser. No. 14/085,883 filed Nov. 21, 2013, now U.S. Pat. No. 9,027,978, which is a continuation of U.S. patent application Ser. No. 13/741,870 filed Jan. 15, 2013, now U.S. Pat. No. 8,616,604, which is a divisional application of U.S. patent application Ser. No. 12/767,555, filed Apr. 26, 2010, now U.S. Pat. No. 8,382,181, the entire disclosure of which is hereby incorporated herein by reference.

TECHNICAL FIELD

The present disclosure is generally related to emergency vehicles, and is specifically directed to emergency vehicle patient transport systems that provide a chair with access to a patient.

BACKGROUND

Emergency vehicles are commonly used to transport sick or injured persons (patients) while they are secured to a patient cot. Generally, patients require procedures to be performed on them by emergency medical technicians while being transported. However, a technician riding unrestrained is one risk factor that has contributed significantly to the fatality rate of such workers when involved in a vehicle crash. Thus, a need exists for emergency vehicle patient transport systems that provide innovative ways to securely restrain emergency medical technicians, or any other medical personnel, while they are providing hands-on treatment to patients during transport.

SUMMARY

It is against the above background that embodiments according to the present disclosure are provided. In one embodiment, an emergency vehicle patient transport system includes: a loading passage providing access to an interior of an emergency vehicle; one or more tracks coupled to a floor of the emergency vehicle, a ceiling of the emergency vehicle, a wall of the emergency vehicle or combinations thereof wherein, a travel path is delineated by the one or more tracks; and a chair slidingly engaged with the one or more tracks, and vertically positioned between the floor and the ceiling. The chair locks in one or more set positions. And, the one or more set positions are selected from a group consisting of an airway care position, an extended airway care position, a procedural care position, a responder position, a patient care position, and a patient load position.

In another embodiment, an emergency vehicle patient transport system includes a ceiling track coupled to a ceiling of an emergency vehicle, a floor track coupled to a floor of the emergency vehicle, and a chair vertically positioned between the floor and the ceiling. The chair includes a curved vertical member disposed between the ceiling and the floor and slidingly engaged with the ceiling track and the floor track.

These and additional features provided by the embodiments of the present disclosure will be more fully understood in view of the following detailed description, in conjunction with the drawings.

BRIEF DESCRIPTION OF THE DRAWINGS

The following detailed description of specific embodiments of the present disclosure can be best understood when read in conjunction with the following drawings, where like structure is indicated with like reference numerals and in which:

FIG. 4A depicts a side orthographic view of a chair according to embodiments of the present disclosure;

FIG. 4B depicts a front orthographic partial cut-away view of a chair according to embodiments of the present disclosure;

FIG. 4C depicts a side orthographic view of a chair according to embodiments of the present disclosure;

FIG. 4D depicts a side orthographic view of a chair according to embodiments of the present disclosure;

FIG. 4E depicts a side perspective view of a chair according to embodiments of the present disclosure;

FIG. 4F depicts a side perspective view of a chair according to embodiments of the present disclosure;

FIG. 5A depicts a schematic diagram of an emergency vehicle patient transport system according to embodiments of the present disclosure;

FIG. 6A depicts a side perspective view of an emergency vehicle patient transport system according to embodiments of the present disclosure;

FIG. 6B depicts a side perspective view of a auxiliary storage module according to embodiments of the present disclosure;

FIG. 7A depicts a side perspective view of a multi-position seat according to embodiments of the present disclosure;

FIG. 7B depicts a side perspective view of a multi-position seat according to embodiments of the present disclosure;

FIG. 7C depicts a side perspective view of a multi-position seat according to embodiments of the present disclosure;

FIG. 7D depicts a side perspective view of a multi-position seat according to embodiments of the present disclosure;

FIG. 10 depicts a schematic diagram of an emergency vehicle patient transport system according to embodiments of the present disclosure.

Figure 1:
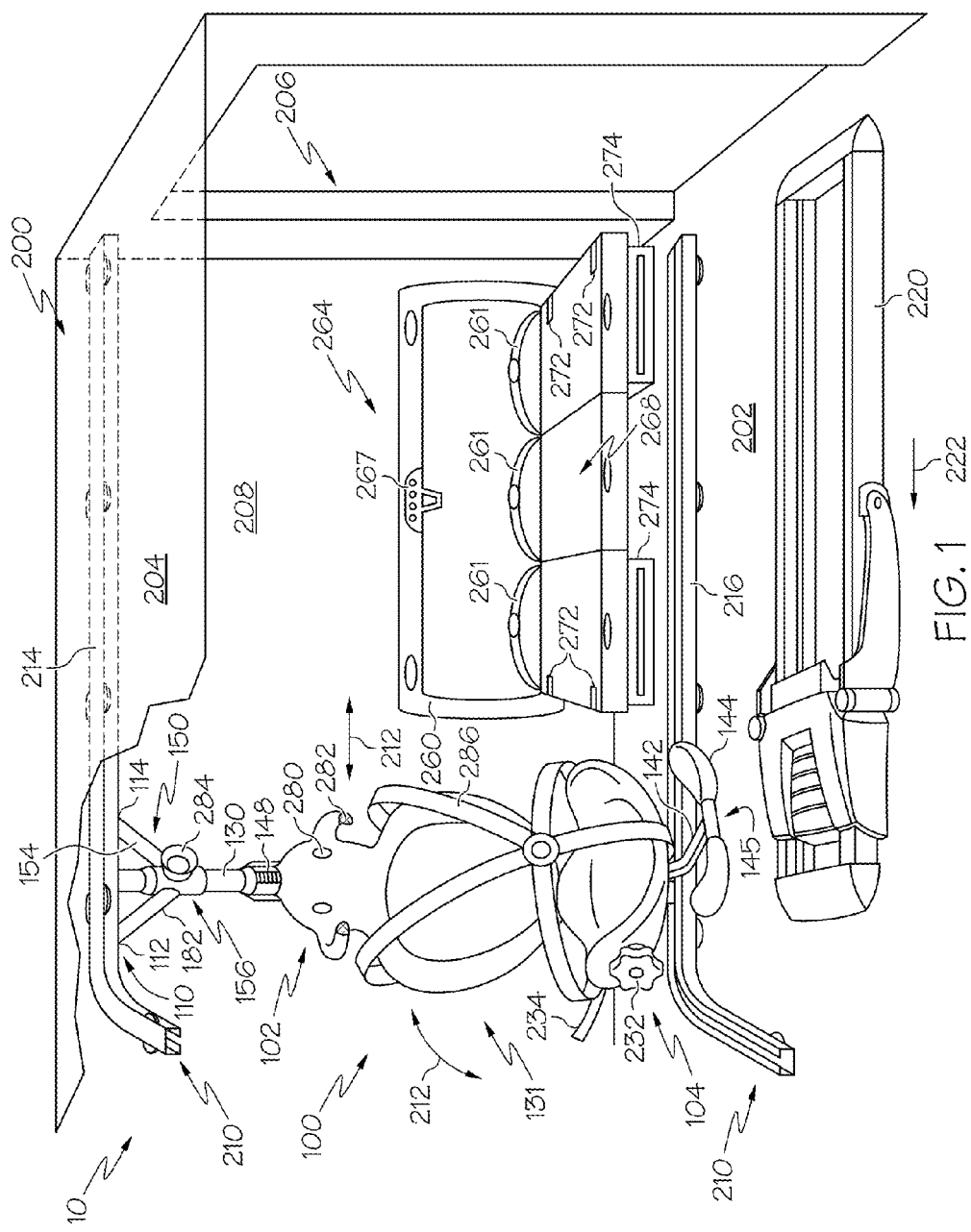
FIG. 1 depicts a side perspective view of an emergency vehicle patient transport system according to embodiments of the present disclosure.

The embodiments set forth in the drawings are illustrative in nature and not intended to be limiting of the invention defined by the claims. Moreover, individual features of the drawings and invention will be more fully apparent and understood in view of the detailed description.

DETAILED DESCRIPTION

As used herein with the various illustrated embodiments described below, the following terms include, but are not limited to, the following meanings.

The term "emergency vehicle" means a vehicle for treatment and transportation of sick or injured people such as for example, a van, a station wagon, a bus, a helicopter, a fixed-wing aircraft, a boat, a ship, and the like.

The term "loading passage" means an aperture that provides access to a portion of an emergency vehicle that is configured to hold people, cargo, and the like. The loading passage may include a door, for example, a sliding door, or a swiveling door in one or more exemplary embodiments.

The term "cot" means a device configured to carry an injured, a dead, or an incapacitated person from one place to another such as for example, a stretcher, a wheeled stretcher, a litter, and the like.

The term "swivel" means to turn or rotate about an axis such as for example, to spin, to twist, to turn, and the like.

The term "tilt" means to transition an object throughout alternate positions such as for example, to rock, to lean, to incline, and the like.

The term "translation member" means a device that allows for constrained relative motion between two or more objects, which may or may not be lubricated, such as for example, a roller, a bearing, a sliding track, a guide block, and the like.

The term "coupled" means that multiple objects are united together such as for example, bolted, welded, anchored, integral, and the like. "Coupled" may mean that the respective objects are directly joined together or the respective objects may be joined together by one or more components there between.

The term "ceiling" means any interior surface of an emergency vehicle with a surface normal vector having vector component pointing in opposite direction of gravity.

The term "floor" means any interior surface of an emergency vehicle with a surface normal vector having a vector component pointing in the same direction as gravity.

The term "crash event" means a rapid alteration of the motion of an emergency vehicle such as for example, a collision, an evasive maneuver, a sudden stop, a bump, and the like.

The phrase "mitigate the transfer of energy between" means to absorb or disperse a portion of energy as it travels from a first object to a second object, from a second object to a first object, or from a first object to a second object and from a second object to a first object to limit any of a vibration, translation, extension, compression, and the like of any of the objects.

The term "slidingly engaged" means to join two or more objects together in a way that enables a constrained relative motion between the two or more objects.

The term "actuator" means mechanism that supplies and transmits a measured amount of energy for the operation of another mechanism or system, such as for example, a hydraulic press, a motor, a mechanical linkage, an electro-mechanical system, and the like.

The term "bio-safe material" means a substance that prevents, inhibits or kills the growth of microorganisms such as protozoa, viruses, bacteria, fungi, mold, mildew, and the like.

The embodiments described herein generally relate to emergency vehicle patient transport systems. As will be described in more detail herein, an emergency vehicle patient transport system generally comprises a chair and one or more tracks. The systems are generally configured to transport one or more people who may be injured or incapacitated. The operation and structure of embodiments of the present disclosure will be described in more detail below, with each of the above stated components described in turn.

As shown in FIGS. 1-4E, embodiments of the emergency vehicle transport system 10 comprise a chair 100 and an emergency vehicle 200. The chair 100 is slidingly engaged with one or more tracks 210, and vertically positioned between the floor 202 of the emergency vehicle 200 and the ceiling 204 of the emergency vehicle 200. The chair 100 may be configured to provide various configurations as will be described in more detail below.

With reference to FIG. 1, embodiments of the emergency vehicle transport system 10 comprise a loading passage 206, one or more tracks 210, a patient loading member 220, and a chair 100. The loading passage 206 provides access to the interior of the emergency vehicle 200, and may be any shape. The one or more tracks 210 are coupled to the floor 202, the ceiling 204, a wall 208 or combinations thereof wherein, a travel path 212 is delineated by the one or more tracks 210. It is noted that, the tracks 210 may be integral with a surface such as, for example, a long opening or tunnel in the floor 202 or ceiling 204. Thus, as defined above, coupled may mean that objects are integral with one another.

The patient loading member 220 may be coupled to the floor 202 and is configured to accept a cot at the loading passage 206, guide the cot along a loading direction 222, and secure the cot at a transport position 224. The transport position 224 may be any position that provides for the secure transport of a cot containing a person. For example, after a cot is accepted by the patient loading member 220, it may be manually pushed along the loading direction 222, and the chair may be configured to have contemporaneous motion along the travel path 212 while the cot is in motion. It is noted that, the cot may be guided along the loading direction 222 by manual pushing, mechanical actuation, electrical actuation, and the like.

Figure 8A:
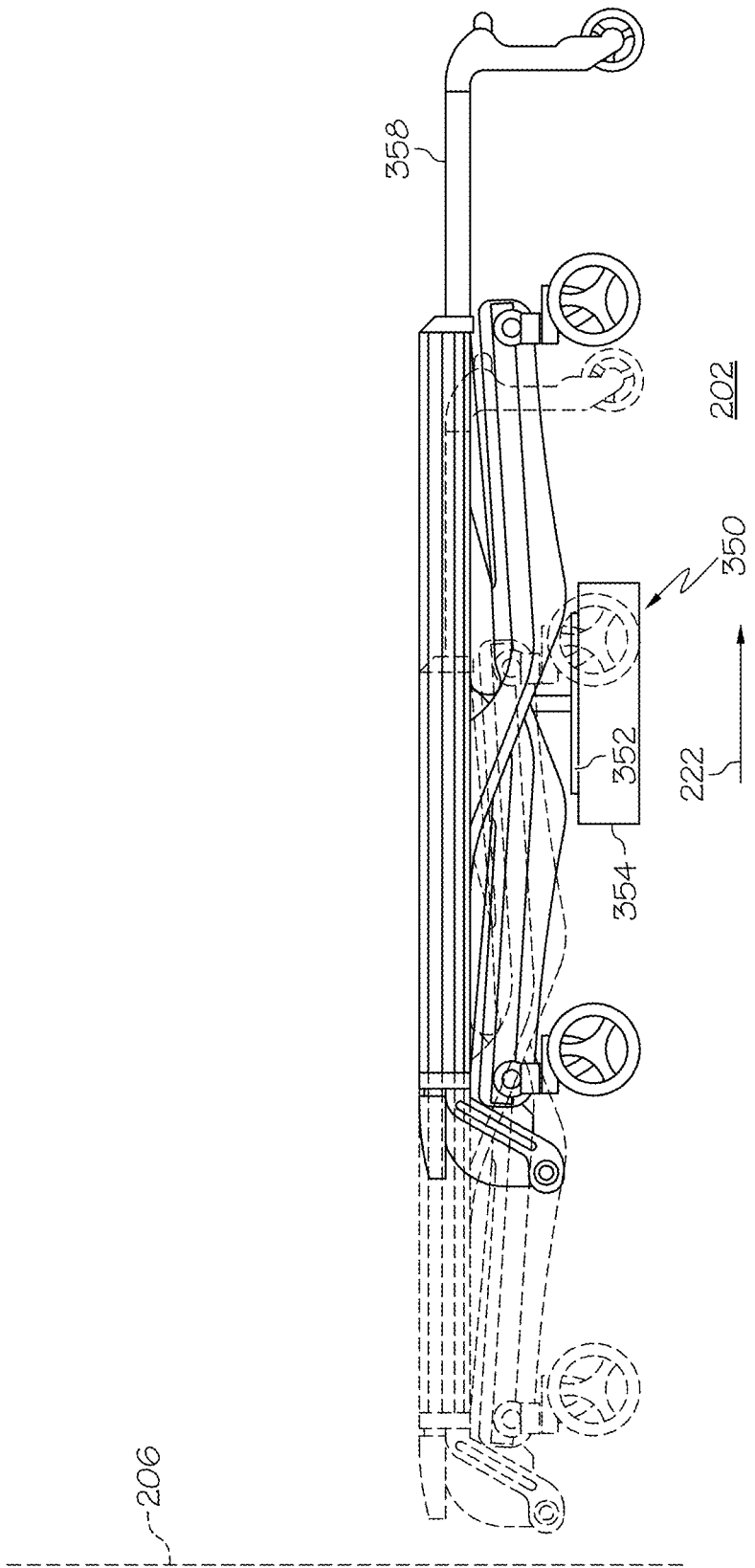
FIG. 8A depicts a side orthographic view of a cot securing member according to embodiments of the present disclosure.
Figure 8B:
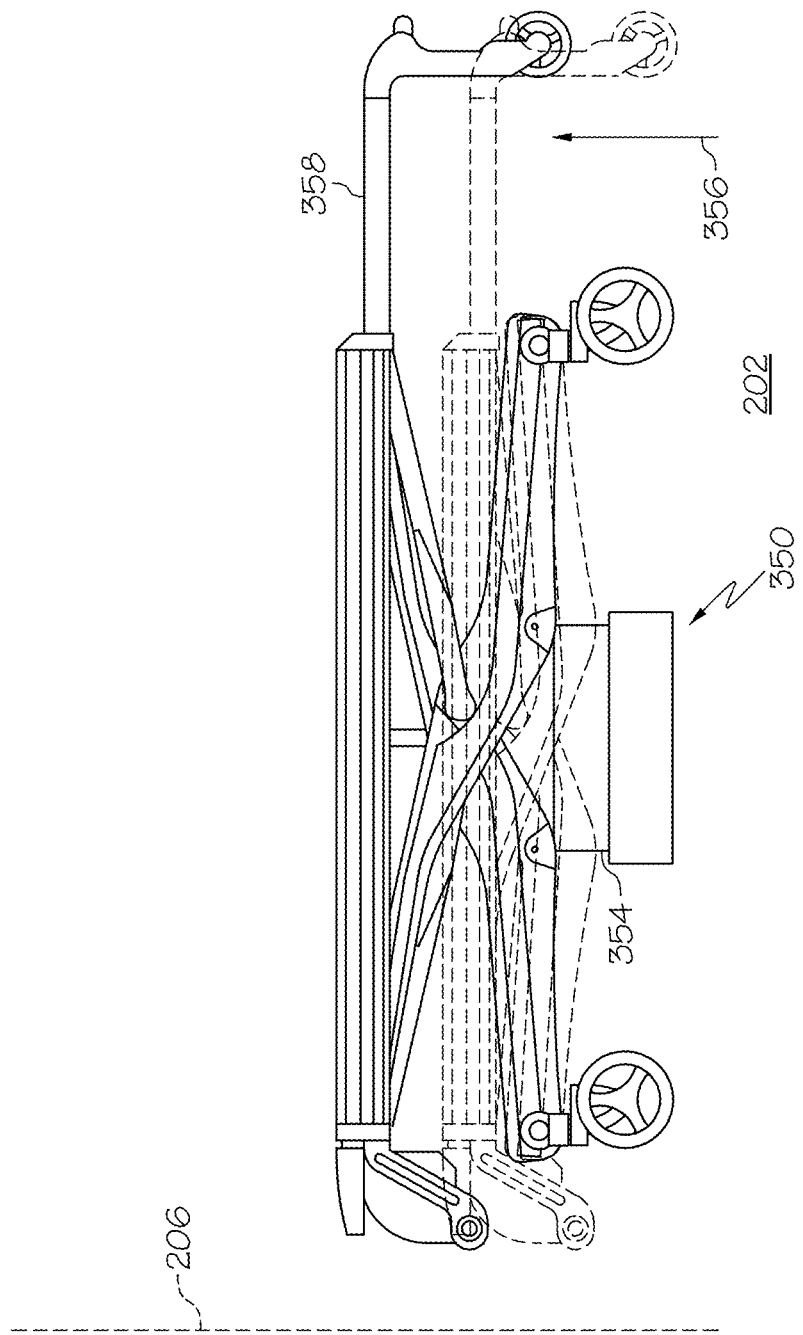
FIG. 8B depicts a side orthographic view of a cot securing member according to embodiments of the present disclosure.

Referring now to FIGS. 8A and 8B, embodiments of the emergency vehicle transport system 10 comprise a cot securing member 350 coupled to the floor 202 that cooperates with an extensible cot 358 to lift a patient along a cot raising direction 356. The cot securing member 350 comprises a cot engagement surface 352 and an extending column 354. The cot engagement surface 352 is coupled to the top of the extending column 354. The extensible cot 358 is configured to engage with the cot engagement surface 352. For example, the extensible cot 358 can be manually loaded onto the emergency vehicle 200 along the loading direction 222, and as the extensible cot 358 passes over the engagement surface a locking portion of the extensible cot 358 engages a corresponding portion of the cot engagement surface 352. The patient is lifted as the extending column 354 moves along the cot raising direction 356, and the linkage of the extensible cot 358 expands. The extending column 354 is depicted as a hydraulic press, and may be any type of actuator such as, for example, a mechanical linkage, an electromechanical actuator, and the like. In another embodiment, the cot securing member 350 is configured to raise and lower a cot engaged with the cot engagement surface 352.

In further embodiments, as depicted in FIGS. 1 and 8B, the chair 100 is configured to move synchronously with the cot. For example, the chair 100 automatically moves along the travel path 212 in accordance with the motion of the cot as the cot is guided along or against the loading direction 222. In other embodiments, the chair 100 may automatically transition between set positions (described in more detail below) in accordance with the motion of the cot as it is raised or lowered. In one commercial embodiment, the cot may be moved by an electrical actuation device such as the devices described in U.S. Pat. No. 7,521,891 assigned to Ferno-Washington, Inc. and the POWERFlexx™+ICS Integrated Charging System produced by Ferno-Washington, Inc., which is used as a cot fastener and a power source for powered cots. The synchronous motion may be provided by an automated actuation such as mechanical actuation or electrical actuation. The synchronization of the cot and chair 100 may be achieved using various components, for example, sensors, linear synchronous motors, mechanical linkages, electro-mechanical actuators, hydraulic actuators, and the like.

In another embodiment, the chair 100 comprises a bio-safe material. For example, the chair 100 may be coated with a bio-safe material, such as, but not limited to, an antimicrobial. Alternatively, the chair 100 comprises solid materials such as plastics, coatings, textiles, ceramics and paper with integral bio-safe material.

In further embodiments of the present disclosure, as shown in FIGS. 1, 4A, 4B, 4C, and 10 the one or more tracks 210 may comprise a ceiling track 214 coupled to the ceiling 204 and a floor track 216 coupled to the floor 202. The tracks 210 may be coupled above surface, i.e. disposed in a position that is in the positive direction of the surface normal relative to the surface, or recessed, i.e. disposed in a position that is in the negative direction of the surface normal relative to the surface. Thus, the tracks 210 may be visible to an occupant of the emergency vehicle 200 or hidden from view. Additionally, the tracks 210 may be shaped in any manner that delineates a travel path 212 that provides access to a cot in the transport position 224. The tracks 210 are depicted in FIG. 1 as being J-shaped. However, the tracks 210 may be any shape such as, but not limited to, straight, L-shaped, U-shaped 402 (FIG. 10), O-shaped 404, faceted, and the like. Similarly, the one or more tracks 210 may comprise any shape cross-section that provides for constrained relative motion with a translation member. Thus, while FIGS. 1, 4A, and 4C depict a C-channel cross-section, the tracks may comprise any other shape such as, circular, square, and the like.

Referring to FIG. 1, the chair 100 may comprise one or more ceiling translation members 110 slidingly engaged with the ceiling track 214 and/or one or more floor translation members 120 slidingly engaged with the floor track 216. The one or more ceiling translation members 110 and/or the one or more floor translation members 120 may comprise roller wheels 113. It is noted that while, roller wheels 113 are depicted, it is contemplated that the translation members 110 and 120 may comprise any device that allows for constrained relative motion between the translation members 110 and 120 and the one or more tracks 210, as described hereinabove.

As shown in FIGS. 1 and 4A, the chair 100 may also comprise a vertical member 130 extending from the ceiling translation members 110 to the floor translation members 120. Moreover, the chair 100 further comprises a seat 131 comprising an upper portion 102 and a lower portion 104. As used herein, "seat" refers to the support members (for example, cushioned support members) which contacts the person (for example, the EMT) disposed in the chair. The upper portion 102 is the support for upper torso (i.e., the back and lumbar sections of the EMT) and may also encompass supports for the head and neck, whereas the lower portion is the support for the lower torso i.e., the buttocks and legs. The seat 131 may comprise an upper chair junction 136 adjacent the upper portion 102 and rotatably joined to an upper frame junction 132 of the vertical member 130 via an upper arm 134 there between. The seat 131 also a lower chair junction 138 adjacent the lower portion 104 and rotatably joined to the vertical member 130 via a lower arm 140 there between.

As shown in FIGS. 1, 4A, and 4B, in embodiments of the emergency vehicle transport system 10, the chair 100 comprises one or more ceiling absorption members 150 disposed between the vertical member 130 and the one or more ceiling translation members 110, and one or more floor absorption members 160 disposed between the vertical member 130 and the one or more floor translation members 120. The one or more ceiling absorption members 150 are configured to mitigate the transfer of energy between the one or more ceiling translation members 110 and the vertical member 130. The one or more floor absorption members 160 are configured to mitigate the transfer of energy between the one or more floor translation members 120 and the vertical member 130. It is noted that, the absorption members 146, 150 and 160 may be any device suitable to disperse energy, such as, but not limited to, a shock, a strut, a spring, a piezoelectric component, a rubber bumper, a crumple pad, and the like.

Referring again to FIGS. 1 and 4B, in further embodiments of the emergency vehicle transport system 10, the one or more ceiling translation members 110 comprise a first ceiling translation member 112, and a second ceiling translation member 114, and the one or more floor translation members 120 comprise a first floor translation member 122, and a second floor translation member 124. The one or more ceiling absorption members 150 comprise a first ceiling absorption member 152, and a second ceiling absorption member 154. The one or more floor absorption members 160 comprise a first floor absorption member 162, and a second floor absorption member 164. The first ceiling absorption member 152 may extend from the first ceiling translation member 112 to an upper triangulation point 156 of the vertical member 130. The second ceiling absorption member 154 extends from the second ceiling translation member 114 to the upper triangulation point 156 of the vertical member 130. The first floor absorption member 162 extends from the first floor translation member 122 to a lower triangulation point 166 of the vertical member 130. The second floor absorption member 164 extends from the second floor translation member 124 to the lower triangulation point 166 of the vertical member 130. While, the first ceiling absorption member 152, the second ceiling absorption member 154, the first floor absorption member 162, and the second floor absorption member 164 are coupled to the vertical member 130. Again, it is noted, the absorption members 152, 154, 162, and 164 may be any device suitable to disperse energy, as described above.

As depicted in FIGS. 4D and 5B-5E, embodiments of the chair 100 comprise a vertical member 130 forming a curve between the ceiling 204 and the floor 202. The vertical member 130 is substantially "bow" shaped, such that it partially surrounds the seat 131. In another embodiment, the chair 100 comprises a vertical channel 300 along an upper portion of the vertical member 130. A seat support member 310 is coupled to an upper support translation member 312 that is slidingly engaged within the vertical channel 300 at a first end 311, and is coupled to a channel pivot member 306 that is rotatably joined with the vertical member 130 at a second end 313. A channel stop 304 terminates the vertical channel 300, and is angled to define the outer end of the vertical channel 300. Impact support wings 302 are coupled to the vertical member 130 and extend downward towards the floor 202, thereby forming an extension adjacent to the vertical channel 300.

Figure 5B:
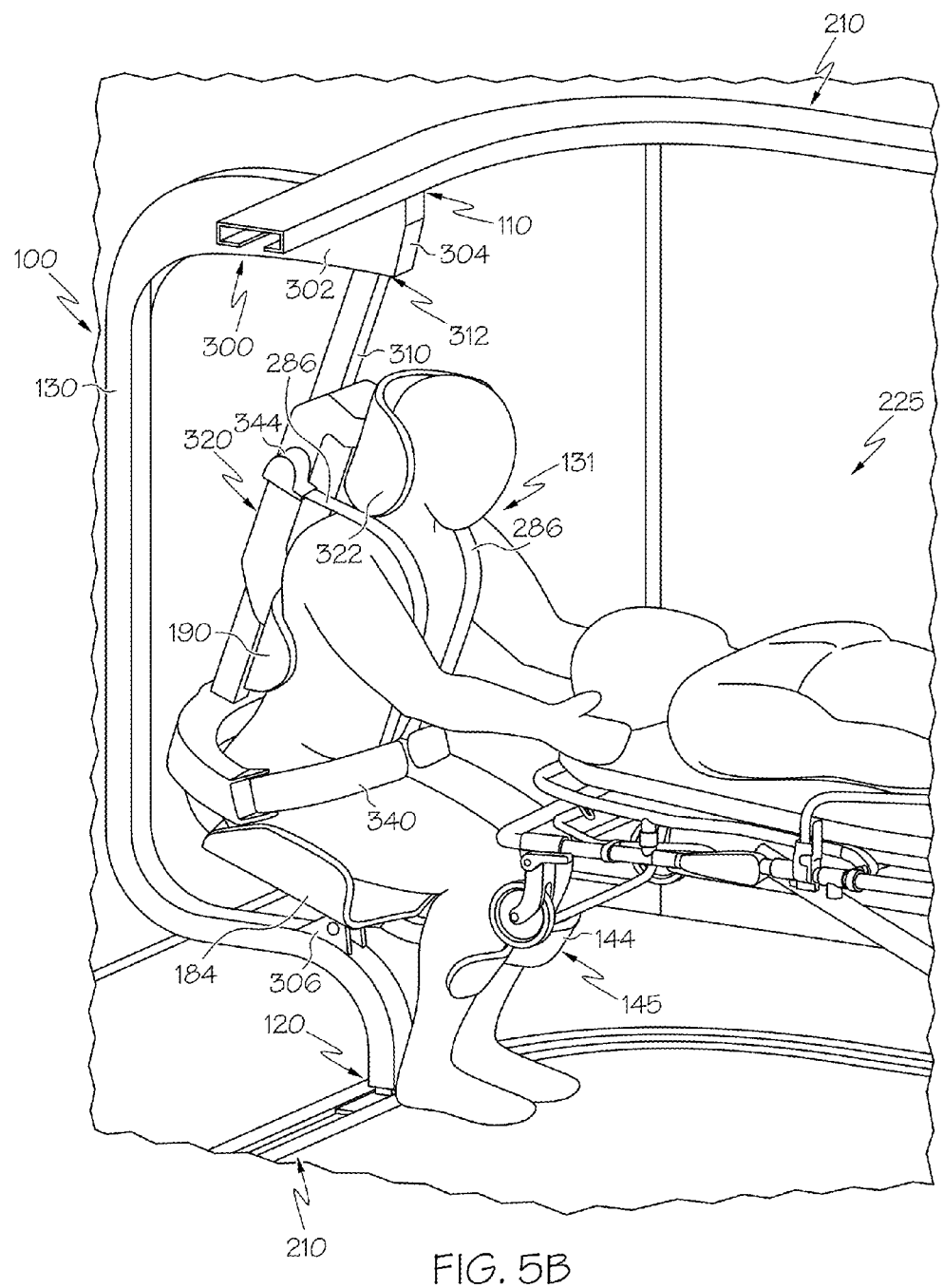
FIG. 5B depicts a partial cutaway side perspective view of an emergency vehicle patient transport system according to embodiments of the present disclosure.
Figure 5C:
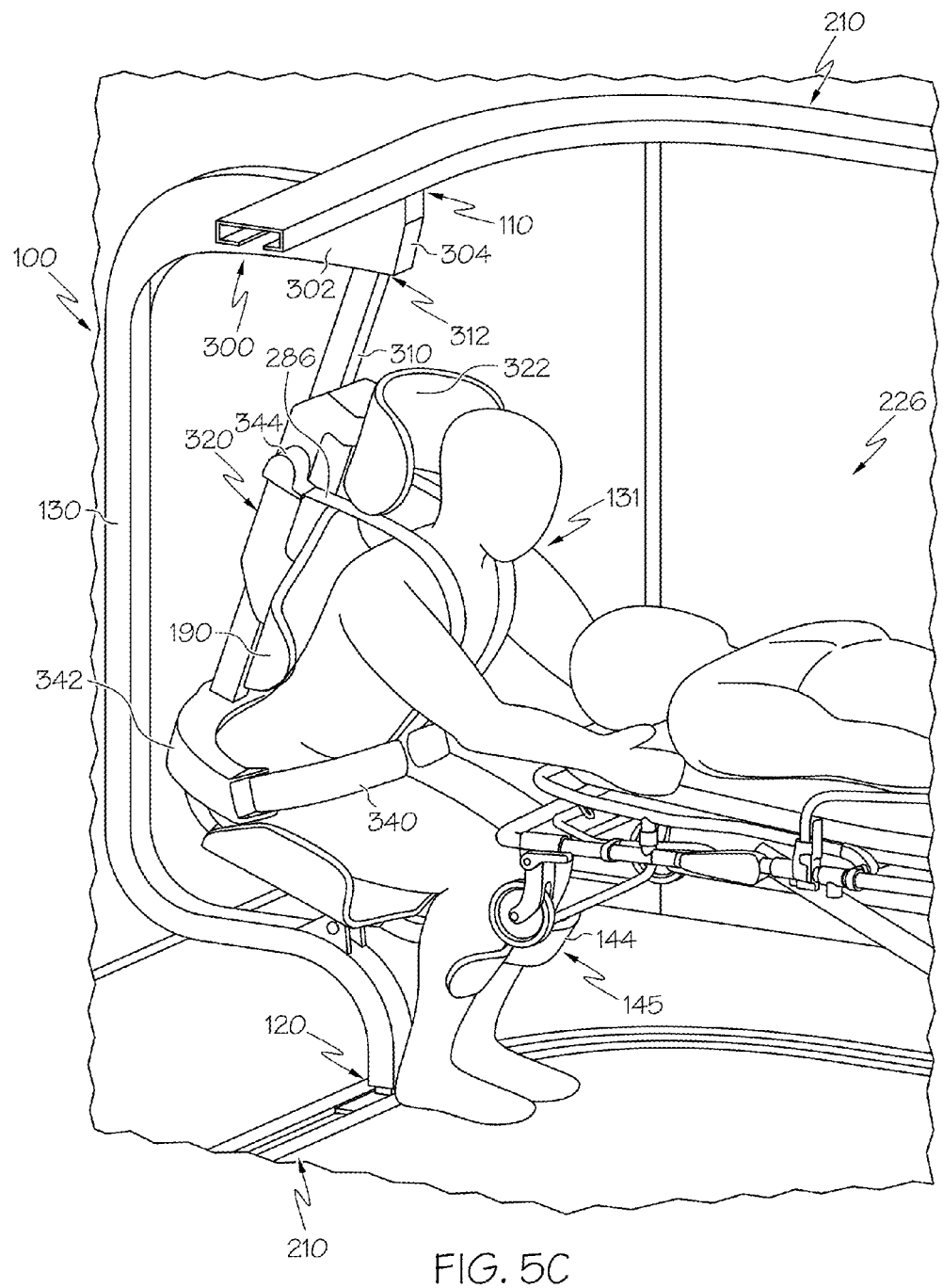
FIG. 5C depicts a partial cutaway side perspective view of an emergency vehicle patient transport system according to embodiments of the present disclosure.
Figure 5D:
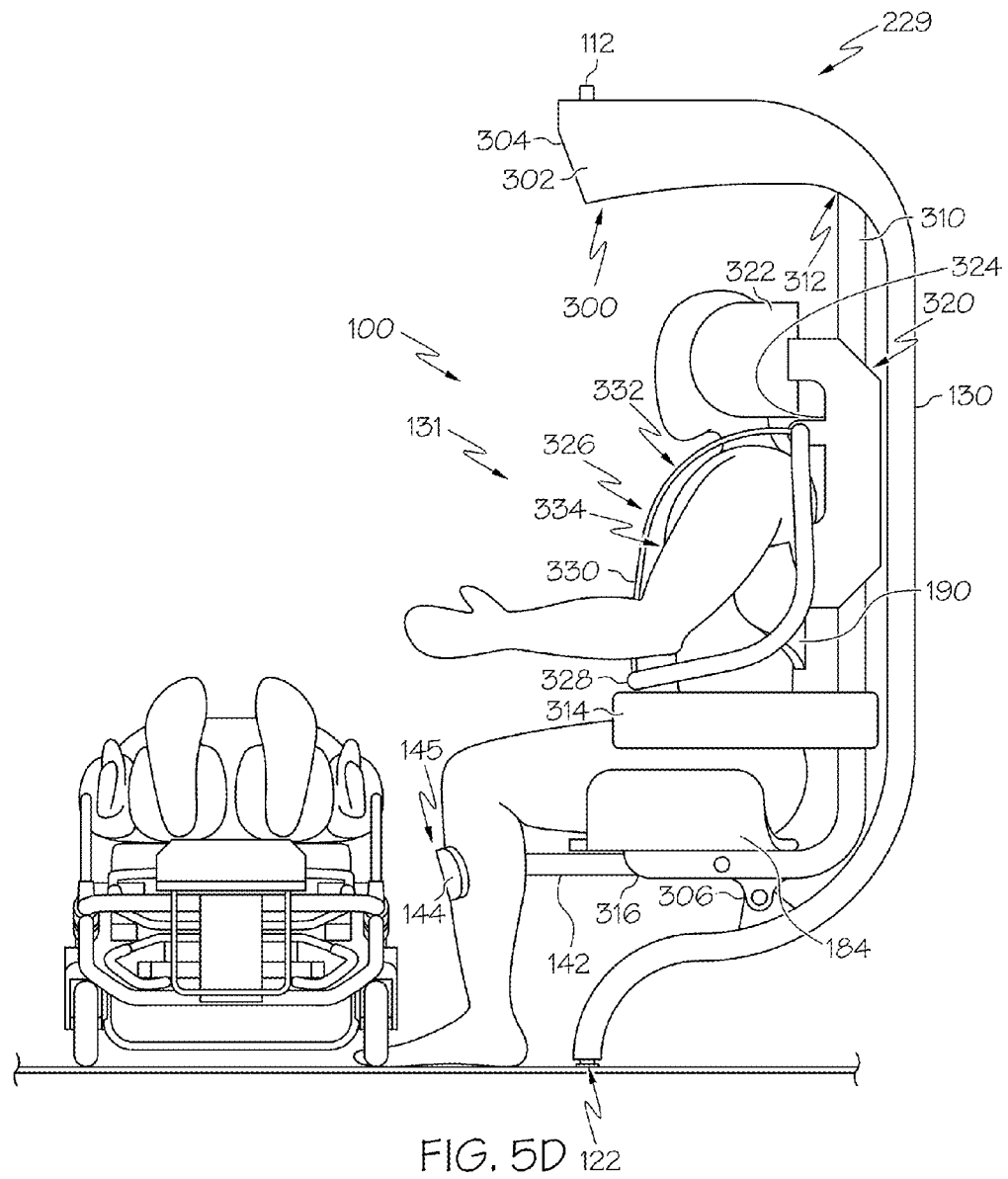
FIG. 5D depicts a partial cutaway side orthographic view of an emergency vehicle patient transport system according to embodiments of the present disclosure.

Further embodiments of the chair 100, depicted in FIGS. 4D and 5D, comprise a sliding upper body member 320 slidingly engaged with the seat support member 310, and a posterior support 184 coupled to the seat support member 310. A contoured head support 322 and a torso support 190 are coupled to the sliding upper body member 320 with the contoured head support 322 disposed above the torso support 190. The sliding upper body member 320 slides towards the floor 202 or the ceiling 204 to adjust the location of the contoured head support 322 and the torso support 190 with respect to the posterior support 184. A seat 131 is formed by the combination of the posterior support 184, the contoured head support 322, and the torso support 190. A lap bar 314 and a rotating restraint 326 provide a locking enclosure about the seat 131. The lap bar 314 is coupled to the sliding upper body member 320 and disposed above the posterior support 184. The lap bar 314 is fixed and padded to provide a cushioned surface partially surrounding an aperture about the posterior support 184. The rotating restraint comprises an outer bar 328 that is rotatably joined to the sliding upper body member 320, and a chest restraint 330 that is coupled to the outer bar 328. The chest restraint 330 defines a head aperture 332 and the chest restraint 330 and outer bar 328 in combination define shoulder apertures 334. The head aperture 332 and shoulder apertures 334 provide openings in the enclosure. The rotating restraint 326 swivels about the sliding upper body member 320 between an open position (not shown) and a closed position. Therefore, the chair 100 provides ergonomic and secure seating for an EMT. For example, once the height of an EMT is known, the sliding upper body member 320 is adjusted to match the height. The rotating restraint 326 is opened by swiveling the chest restraint 330 towards the ceiling. The EMT sits in the chair 100 and positions each shoulder in the shoulder apertures 334 and her head through the head aperture 332. Once the EMT is seated, the rotating restraint 326 swivels closed, and secures the EMT in the chair 100. Thus, it is noted that the rotating restraint may lock in any position within its range of motion to accommodate EMT's with varying body types.

In an embodiment depicted in FIGS. 4E, 4F, 5B, 5C, and 5E, the seat 131 comprises locking mechanisms 344 rotatably joined to the sliding upper body member 320 and hip grabbers 340 rotatably joined with the lap bar 314. The locking mechanisms 344 are coupled to the harnesses 286 which extend to and are coupled to the hip grabbers 340. The locking mechanisms 344 tighten the harnesses 286 when the harnesses 286 are pulled suddenly, but offer little resistance when the harnesses 286 are pulled slowly. The locking mechanisms 344 are inertia reels, but may also comprise a centrifugal clutch, a weighted pendulum, a weighted ball bearing, or any other electro-mechanical actuator. In another embodiment, the seat 131 comprises hip actuator 342 disposed within the lap bar 314. The hip actuator 342 is rotatably joined with the hip grabbers 340 and open (FIG. 4E) and close (FIG. 4D) the hip grabbers 340. Thus, providing secure seating for an EMT. For example, an EMT sits on the posterior support 184 and slides each arm beneath the harnesses 286 while the seat 131 is in the open position (FIG. 4E). A pressure sensor within the posterior support 184 and in electrical communication with the hip actuator 342 senses the presence of the EMT. The pressure sensor transmits an electronic signal indicative of the EMT's presence to the hip actuator 342, and the hip actuator 342 rotates the hip grabbers 340 to the closed position (FIG. 4D). It is noted that while a pressure sensor is described hereinabove, any type of system may be utilized to indicate the presence of the EMT such as, for example, a button, a thermal sensor, a imaging system, or an acoustic system.

Referring now to FIG. 4A, the chair 100 may also comprise a knee member 142 and one or more knee pads 144 attached to the knee member 142 wherein, the lower chair junction 138 rotatably joins the lower arm 140 to the knee member 142, and the knee member 142 extends to the one or more knee pads 144. In further embodiments, the upper arm 134 comprises an upper chair absorption member 146 configured to mitigate the transfer of energy between the upper portion 102 and the vertical member 130, or vice versa.

Figure 5E:
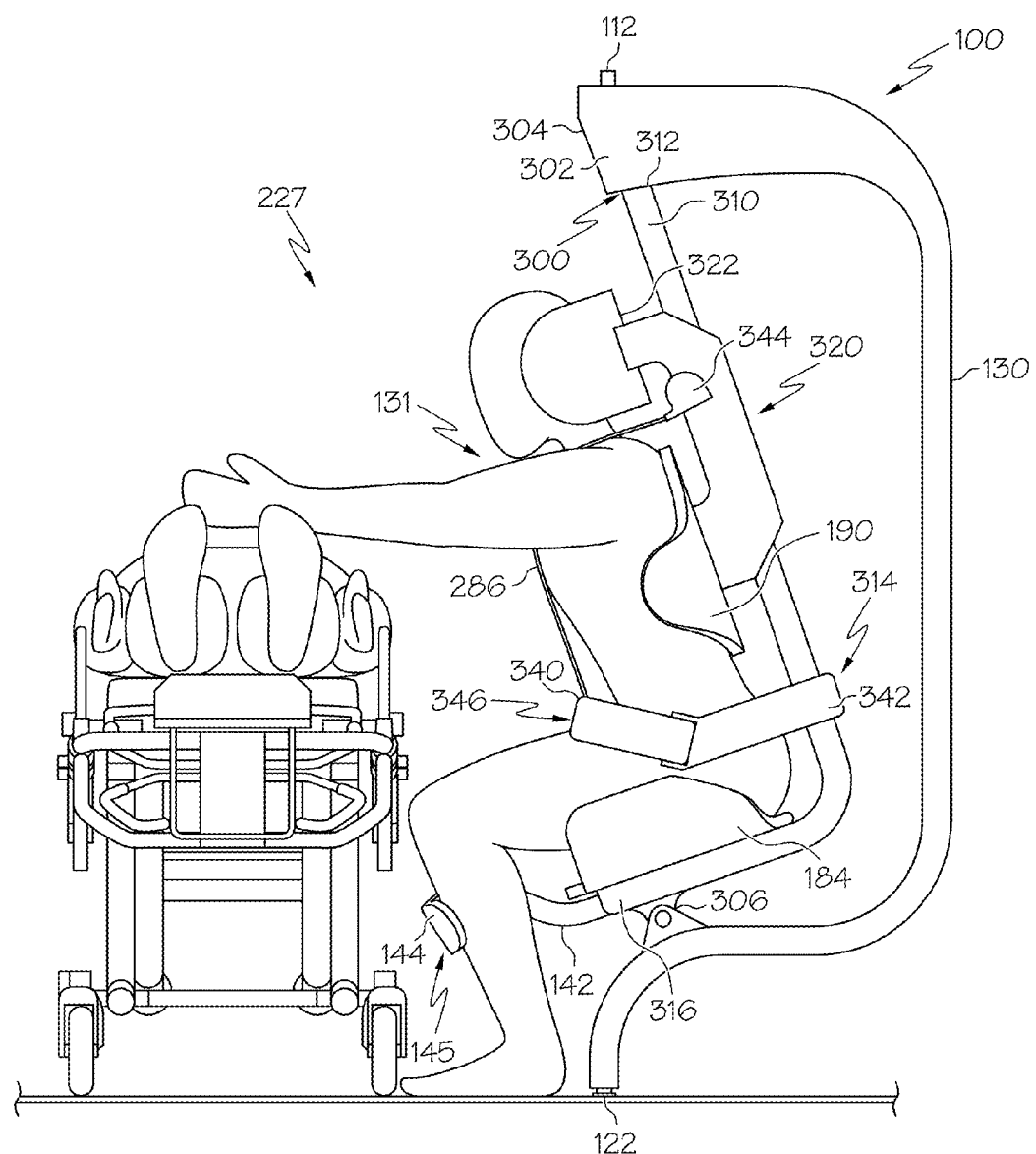
FIG. 5E depicts a partial cutaway side orthographic view of an emergency vehicle patient transport system according to embodiments of the present disclosure.

In further embodiments of the emergency vehicle transport system 10, as shown in FIGS. 4D, 5D and 5E, a knee actuator 316 is coupled to the seat support member 310. The knee member 142 is slidingly engaged with the knee actuator 316, and extends away from the seat support member 310. The knee member 142 is coupled to the knee pad 144, and the knee actuator 316 extends and retracts the knee member 142. For example, the knee actuator 316 applies a linear force to the knee member 142 and extends the knee support 145 away from the posterior support 184 to provide an ergonomic seating arrangement. Furthermore, it is noted that, the actuation of the knee actuator 316 may be synchronized with the tilting forward of the chair 100 or set positions, as described hereinafter.

Referring again to the embodiment of FIG. 1, the chair 100 further comprises a tilt control 148 which is operable to enable or disable a tilting forward of the chair 100. The tilt control 148 may be any suitable actuation mechanism such as a lever, switch, button, or combinations thereof. Upon actuation of the tilt control 148, an emergency medical technician (EMT) seated in the chair 100 may lean forward (FIG. 4C) and cause the chair 100 to tilt forward. Thus, an EMT may remain secured in the chair 100 by a harness 286 while tending to a patient in a cot secured in the transport position 224.

Further embodiments of the present disclosure provide for tilting forward and are depicted in FIGS. 5B-5E. In one embodiment the EMT tilts forward by loosening the tension on the harnesses 286. For example, the EMT may be attending to a patient (FIG. 5B) and require additional reach. The locking mechanisms 344 release tension on the harnesses 286 and allow the EMT to tilt forward (FIG. 5C). The release of tension may be commenced by the tilt control or via an automated process, such as synchronization. In another embodiment an EMT tilts forward by causing the first end 311 of the seat support member 310 to slide along the vertical channel 300 while the second end 313 to rotates about the channel pivot member 306. Chair 100 slides throughout the full extent of the vertical channel 300. For example, the chair 100 can be upright (FIG. 5D), tilted (FIG. 5E) such that the upper support translation member 312 reaches the channel stop 304, or any position in between. In another embodiment, the chair 100 reclines to provide a comfortable riding position for an EMT during long transports. For example, the EMT may tilt backwards by the tilt control or via an automated process, such as synchronization.

Figure 2:
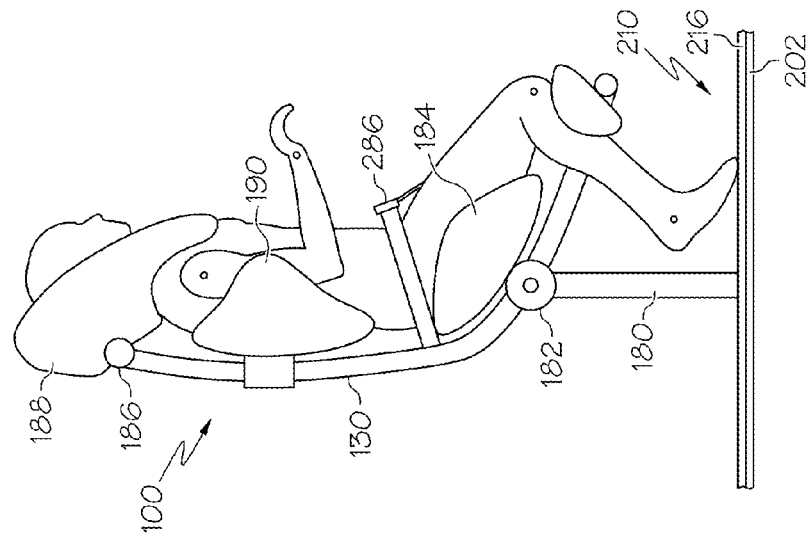
FIG. 2 depicts a side orthographic view of a chair according to embodiments of the present disclosure.

In embodiments wherein the chair is coupled to the ceiling track 214 as shown in FIG. 2, the chair 100 may comprise a pivot junction 170 rotatably joining the vertical member 130 to a lower portion 104 of the chair 100. Moreover, the chair 100 may comprise an adjustable headrest 172 slidingly engaged with the vertical member 130 and operable to slide at least a portion of the distance between the ceiling 204 and the pivot junction 170. Thus, the adjustable headrest 172 may be configured to be in alignment with the head and shoulder area of a user and accommodate users of various heights. A bottom absorption member 174 extends from the vertical member 130 to the lower portion 104 of the seat 131 and is configured to mitigate the transfer of energy between the vertical member 130 and the lower portion 104.

Figure 3A:
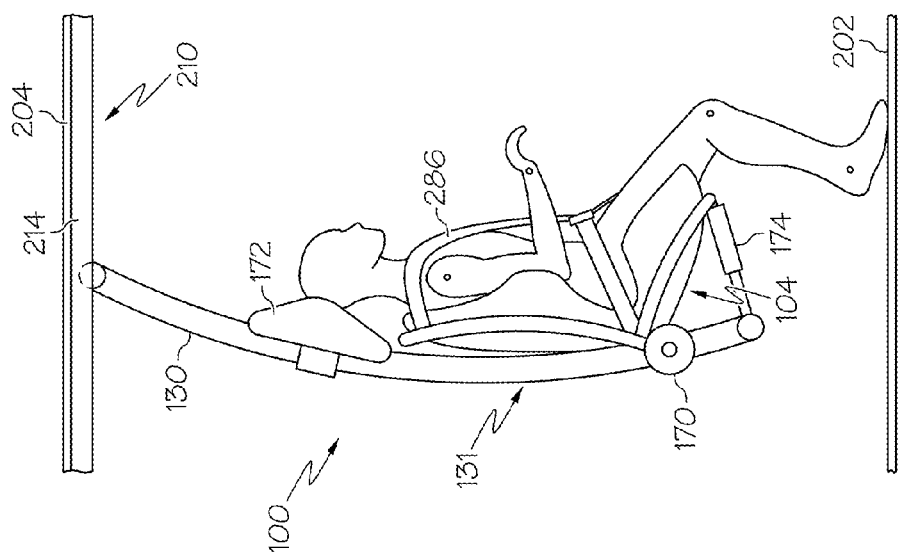
FIG. 3A depicts a side orthographic view of a chair according to embodiments of the present disclosure.
Figure 3C:
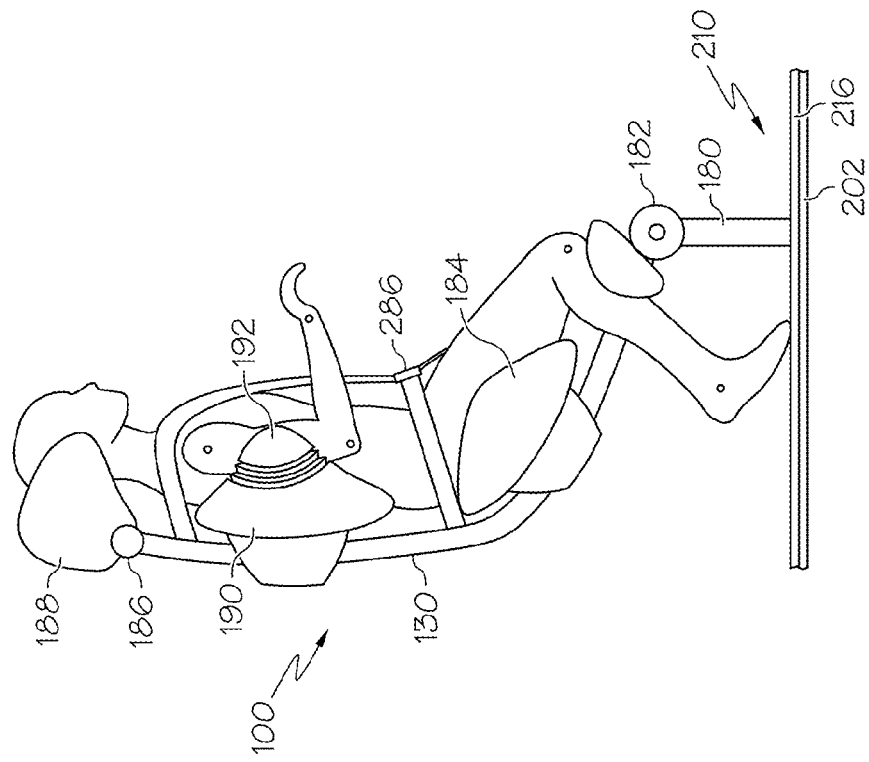
FIG. 3C depicts a side orthographic view of a chair according to embodiments of the present disclosure.

In alternative embodiments wherein the chair 100 is coupled to the floor 202 as shown in FIG. 3A, the chair 100 may comprises a vertical support 180 slidingly engaged to the floor track 216. A seat junction 182 rotatably joins the vertical support 180 to a vertical member 130 and a posterior support 184. A head-neck-shoulder (HNS) junction 186 rotatably joins the vertical member 130 to a HNS support 188. A torso support 190 is slidingly engaged with the vertical member 130 and is operable to slide at least a portion of the distance between the HNS junction 186 and the posterior support 184.

Figure 3B:
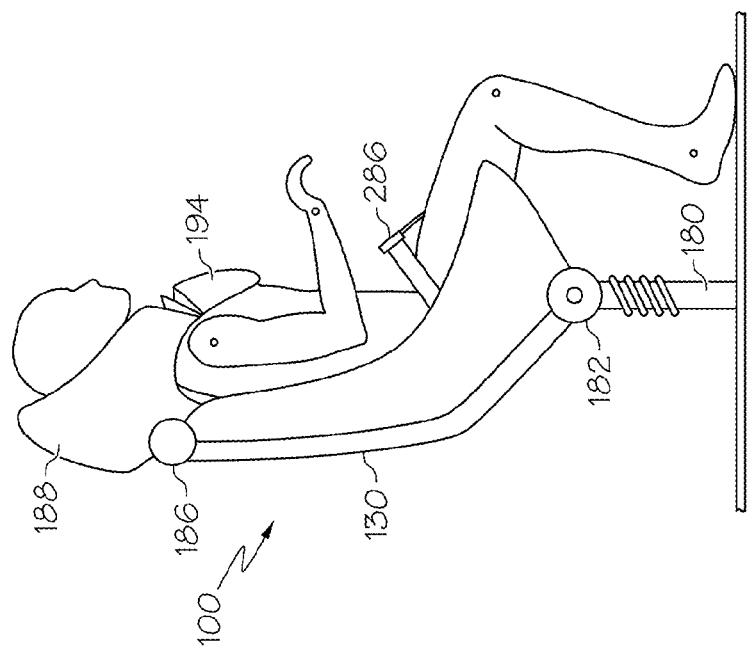
FIG. 3B depicts a side orthographic view of a chair according to embodiments of the present disclosure.

Referring to the embodiments depicted in FIG. 3B, the chair 100 may comprise an adjustable HNS clamp 194 rotatably joined to the HNS support 188 and operable to lock in multiple positions. The HNS support 188 may have a pair of extensions providing surfaces contoured to the HNS area of a user, and may be "U" shaped or "C" shaped, for example. In still further embodiments, depicted in FIG. 3C, the chair 100 comprises an adjustable torso clamp 192 rotatably joined to the torso support 190, and operable to lock in multiple positions. Thus, the clamps 192 and 194 comprise various configurations to accommodate various neck circumferences, shoulder widths, over-bust circumferences, bust circumferences, under-bust (rib-cage) circumferences, natural waist circumferences, upper hip circumferences, lower hip circumferences, and the like. The clamps 192 and 194 may comprise a ratcheting mechanism providing for a discrete progression throughout a range of motion. Furthermore, the clamps 192 and 194 may operate to supplement or replace a safety belt or harness 286 by locking in a position such that a seated EMT is secured in the chair 100 during transit of the emergency vehicle 200.

According to additional embodiments, as depicted in FIGS. 5A-5E, and 10, the chair 100 is configured to lock in one or more set positions. When locked, the chair 100 will not slide along the tracks 210. Thus, the chair 100 is in a single, or set position with respect to the tracks 210. Additionally, the set positions orient the chair 100 with respect to a cot secured to the patient loading member 220. The chair 100 is oriented such that an EMT securely seated within the chair 100 is capable of administering medical treatment to a patient in the cot. For example, the chair 100 may be locked within the lateral zone 292 facing a patient. Since the tracks 210 are proximately positioned to the cot, an EMT secured to the chair 100 is within arms reach of the patient. The set positions comprise an airway care position 225, an extended airway care position 226, a procedural care position 227, a responder position 228 and 428, a patient care position 229 and 429, a patient load position 230 and 430, and a lower care position 231 and 431. Furthermore, when the tracks 210 are U-shaped 402 or O-shaped 404 (FIG. 10), a responder position 228 and 428, a patient care position 229 and 429, a patient load position 230 and 430, and a lower care position 231 and 431 may be disposed on each side of the patient cot. Each of the set positions will be described in greater detail below.

An embodiment of the patient load position 230 is depicted in FIG. 5A. In the patient load position 230, the chair 100 is facing a direction opposing the loading direction 222 near the loading passage 206. An EMT securely seated in the chair 100 is at the head of a patient secured to a cot as it is being loaded through the loading passage 206. Thus, the EMT is favorably positioned to administer care to the patient. Furthermore, it is noted that while the chair 100 is locked in a set position the chair 100 may tilt or swivel. For example, the chair 100 may swivel while in the patient load position 230 to enable an EMT to perform a cardiopulmonary resuscitation on a patient entering through the loading passage 206.

Referring still to FIG. 5A, an embodiment of the responder position 228 is depicted. In the responder position 228, the chair 100 is pointing along the loading direction 222. Thus, an EMT seated in the chair 100 is facing the same direction as the loading direction 222. The responder position may be set when the emergency vehicle 200 is traveling. For example, in an ambulance the loading direction 222 is also the forward travel direction of the ambulance. Thus, an EMT seated in the responder position 228 would be positioned in a similar fashion to the driver of the ambulance. In other embodiments, the responder position 228 may be set to any orientation that offers a seating position analogous to other seating within the vehicle such as, for example, a driver's seat or a passenger seat.

Referring now to FIGS. 5A and 5B, embodiments of the airway care position 225 are depicted. The airway care position 225 is disposed within the head end zone 290. The head end zone 290 is the portion of the emergency vehicle 200 that is about the tracks and near the head of a patient secured within the emergency vehicle 200. An EMT securely seated within the chair 100 is capable of administering a treatment to the head of the patient by tilting forward. When in the airway care position 225, the chair 100 may tilt such that the seat support member 310 rotates about the channel pivot member 306 and the upper support translation member 312 slides within the vertical channel 300. For example, the EMT may administer an intubation procedure without departing from the chair 100 by tilting forward until the upper support translation member 312 reaches the channel stop 304. In another embodiment, depicted in FIG. 5C, additional tilting is enabled. The extended airway care position 226 is disposed near the head of a patient secured within the emergency vehicle 200. An EMT securely seated within the chair 100 is capable of administering a treatment to the head or torso of the patient by tilting forward. Additional reach is provided by a loosening of tension within the locking mechanism 344. The loosened tension provides slack in the harness 286 and provides the EMT with greater freedom of motion while still remaining secured by the hip grabber 340.

Embodiments of the patient care position 229 are depicted in FIGS. 5A, 5D, 10. The patient care position 229 is disposed within the lateral zone 292. The lateral zone 292 is the portion of the emergency vehicle 200 that is about the tracks and along the side of a patient secured within the emergency vehicle 200. An EMT securely seated within the chair 100 is capable of administering a treatment to the body of the patient by reaching forward. An embodiment of the procedural care position 227 provides greater reach to the EMT, and is depicted in FIG. 5E. The procedural care position 227 is disposed in the same location as the patient care position 229, but with additional tilting. When in the procedural care position 227, the chair 100 is tilted such that the seat support member 310 is rotated about the channel pivot member 306 and the upper support translation member 312 reaches the channel stop 304. Furthermore, it is noted that embodiments of the procedural care position 227 may be disposed at any position along the tracks 210 such as, but not limited to, the patient care position 229 and 429 and the lower care position 231 and 431.

Embodiments of the lower care position 231 and 431 are depicted in FIG. 10. The lower care position 231 is disposed within the near the loading passage 206. An EMT securely seated within the chair 100 is capable of administering a treatment to the feet and legs of the patient by reaching forward. It is noted, that while embodiments of the lower care position 231 and 431 are depicted with U-shaped 402 or O-shaped 404 tracks 210, the lower care position 231 and 431 may be used with any of the tracks 210 disclosed herein.

Referring again to FIGS. 5A-5E, it is noted that while only a finite number of set positions were designated above, the chair 100 may be adjusted and locked throughout its entire range of motion. For example, the chair 100 may be locked at any location along the tracks 210, and not just within the head end zone 290 or the lateral zone 292. Furthermore, the chair 100 may swivel about or tilt through an infinite number of positions. Therefore, while only the airway care position 225, the extended airway care position 226, the procedural care position 227, the responder position 228, the patient care position 229, and the patient load position 230 are designated herein, the chair 100 may freely pass through or lock in any position allowable by the structure described and depicted in the present disclosure.

Referring again to FIG. 1, the embodiments may comprise a motion control 232 which is operable to set a free float mode or a synchronous mode. The motion control 232 may include a button, switch, or any other suitable component operable to enable toggling between modes. When the chair 100 is set to the free float mode, the chair 100 moves independently of the automated actuation described hereinabove. Therefore, when in the free float mode the chair 100 moves along the travel path 212, tilts, swivels, or locks in set positions based solely on an EMT's input. The chair 100 moves synchronously according to the automated actuation described hereinabove, when set to synchronous mode. For example, when in the synchronous mode the chair 100 moves along the travel path 212, tilts, swivels, or locks in set positions in a motion coordinated with the loading or lifting of a patient cot, as described herein.

Referring still to FIG. 1, the chair 100 may further comprise a lever 234, which upon actuation, enables the chair 100 to swivel about the vertical member 130. The chair 100 may configured to swivel freely, or may be limited to a set range such as for example, swiveling 180°. Additionally, the chair 100 may comprise a quick release button disposed under the chair 100 or a rocker switch configured for simple control of any motion of the chair 100.

In other embodiments, depicted in FIG. 4D, the chair 100 moves in a vertical direction 106 and/or a horizontal direction 108 via manual pushing, mechanical actuation, electrical actuation, and the like. In one embodiment, the chair 100 moves within the vertical member 130. In another embodiment, the vertical member 130 moves in the vertical direction 106 and/or a horizontal direction 108.

In further embodiments of the present disclosure, as depicted in FIGS. 6A and 6B, the chair 100 comprises an auxiliary storage module 240 that is removably attached to the chair 100. The auxiliary storage module may comprise a pull-up handle 242, a shoulder strap 244, and a wheel 246. In additional embodiments, the auxiliary storage module 240 comprises a flip top 248 and a pullout drawer 250 or a pivot drawer 252 wherein, the flip top 248 provides access to a laptop computer, a clipboard, or a disposable sharps storage. The pullout drawer 250 is a generally box-shaped storage accessible by sliding along a transverse direction. The pivot drawer 252 is a generally triangular-shaped storage accessible by swiveling. The flip top 248 may comprise a linkage which enables multiple tiers to be raise for access or collapsed for compact storage (not shown). In further embodiments, the auxiliary storage module 240 comprises a shallow storage 254 recess having a non-slip surface 256. The non-slip surface 256 may comprise any material suitable to provide additional friction such as for example, an epoxy, a rubber, an abrasive, and the like.

In still further embodiments of the present disclosure, as depicted in FIGS. 1, 6A, and 7A-7D, the emergency vehicle transport system 10 comprises a multi-position seat 260. The multi-position seat 260 is coupled to a wall 208 of the emergency vehicle 200, and comprises a seating portion 268 slidingly engaged with a transition track 270, and a locking release switch 267. The multi-position seat 260 transitions from a flat configuration 262 to a bench configuration 264, and from the bench configuration 264 to either the flat configuration 262 or a jump seat configuration 266. The transitions are reversible. Thus, multi-position seat 260 transitions from the jump seat configuration 266 to the bench configuration 264, and from the bench configuration 264 to either the flat configuration 262 or the jump seat configuration. The multi-position seat 260 changes between the flat configuration 262 and the bench configuration 264 by releasing or locking the seating portion 268 with the locking release switch 267 and rotating the seating portion 268 about hinges. The multi-position seat 260 changes between the bench configuration 264 and the jump seat configuration 266 by sliding the seating portion 268 along the transition track 270. Additionally, it is noted, that the term "wall" as used herein means any surface of the emergency vehicle 200.

Referring now to FIG. 1, further embodiments of the present disclosure comprise a multi-position seat 260 with recessed surfaces 272 for securing a cot. The multi-position seat 260 is in the bench configuration 264 and the recessed surface 272 are shaped to secure a cot. For example, a cot with wheels may be secured by providing recessed surfaces 272 that are contoured to match the shape of the wheels. Thus, when the cot is placed on the multi-position seat 260 the recessed surfaces engage the wheels and prevent the cot from moving.

In further embodiments, depicted in FIGS. 7C and 7D, the multi-position seat 260 comprises a pivoting section 275. The pivoting section 275 is rotatably joined and slidingly engaged with the transition track 270. In one embodiment (FIG. 7C) the multi-position seat comprises a lounge configuration 263. The multi-position seat 260 transitions to the lounge configuration from the bench configuration 264 by sliding along the transition track 270 and rotating a pivoting section 275 in a rotating direction 276. In another embodiment (FIG. 7D), the multi-position seat comprises a dual-jumpseat configuration 265. The multi-position seat 260 transitions from the bench configuration 264 to the dual-jumpseat configuration 265 by sliding the opposing sides of the seating portion 268 along the transition track in a compressing direction 277, and rotating a pivoting section 275. In a further embodiment, the multi-position seat 260 comprises a soft storage bag 274. The soft storage bag is disposed on the bottom of the seating portion and provides storage accessible via a zipper. In yet another embodiment, the multi-position seat 260 comprises retracting safety belts 261. The retracting safety belts 261 secure an occupant of the multi-position seat against movement. For example, an occupant may be secured in the multi-position seat by buckling a locking mechanism of the retracting safety belt 261 about the waist.

Referring again to FIGS. 1, 4A, and 4C embodiments of the chair 100 comprise an earphone 280 and an audio microphone 282. The earphone 280 and audio microphone 282 may be disposed in proximity to the head of an EMT seated in the chair 100, and may facilitate hands-free communication between an EMT seated in the chair 100 and any other person via radio, wireless network, blue tooth, internet, and the like.

In additional embodiments, the chair 100 comprises a video feed 284 operable to transmit images from the emergency vehicle 200. The video feed may be any device capable of capturing and transmitting still or moving images such as, for example, digital camera, web cam, camcorder, and the like. The images may be transported via wireless network, etc. or via a recorded medium. In another embodiment, the chair 100 comprises a fold-away table (not shown). The fold-away table can be pulled out upwards and folded down for use as a writing surface by an EMT. Similarly, the fold-away table can be folded up and pushed in downwards for storage. For example, fold-away tables are commonly used in the passenger compartment of airliners, as described in U.S. Pat. No. 6,793,281, the entirety of which is incorporated by reference herein.

Additional embodiments of emergency vehicle patient transport systems comprise an on-board vehicle electronic monitoring system. The on-board vehicle electronic monitoring system is a network of sensors and computers, such as the RS-3000 Vehicle System by Road Safety, interconnected throughout the emergency vehicle. The sensors are in electrical communication with the network and monitor, for example, vehicle speed, vehicle RPM, idle time, over speeds, hard accelerations, hard decelerations, chair occupancy, g-force, and the like. In one embodiment the on-board vehicle electronic monitoring system is in electrical communication with a sensing member. For example, the chair 100 may comprise a seat sensor that transmits an electrical signal indicative of the occupancy of the seat to the on-board vehicle monitoring system. In another embodiment, the chair 100 comprises a locking mechanism in electrical communication with the on-board vehicle electronic monitoring system. The sensing member senses a crash event such as for example, an accelerometer, transducer, and the like. When a crash event is sensed, by for example an increase in g-force on the vehicle, the on-board vehicle electronic monitoring system transmit an electrical signal to the locking system that triggers the locking system to lock the chair 100. The locking system incorporates components and actuators of the chair 100 described hereinabove, such as, the tilt control 148, the adjustable torso clamp 192, adjustable HNS clamp 194, the locking mechanism 344, the harnesses 286, the rotating restraint 326, the hip actuator 342, and so on. For example, when a crash is detected, the on-board vehicle electronic monitoring system transmits an electrical signal to the chair 100 causing the chair 100 to lock in place and tighten the harness 286 to secure an EMT. Additionally, either or both of the chair 100 and the patient loading member 220 can comprise an airbag (not shown). The air bag may be disposed at a position near a head of a patient in a cot engaged with the patient loading member 220. Thus, during a crash event, airbags may deployed adjacent to the heads of an EMT or a patient.

In a further embodiment, depicted in FIGS. 4E and 4F, the chair 100 comprises environmental controls 346. The environmental controls 346 control the environment heating, cooling, oxygen, suction, lights, and the like. Thus, as described herein, EMT safety and environmental performance may be controlled and monitored.

Figure 9:
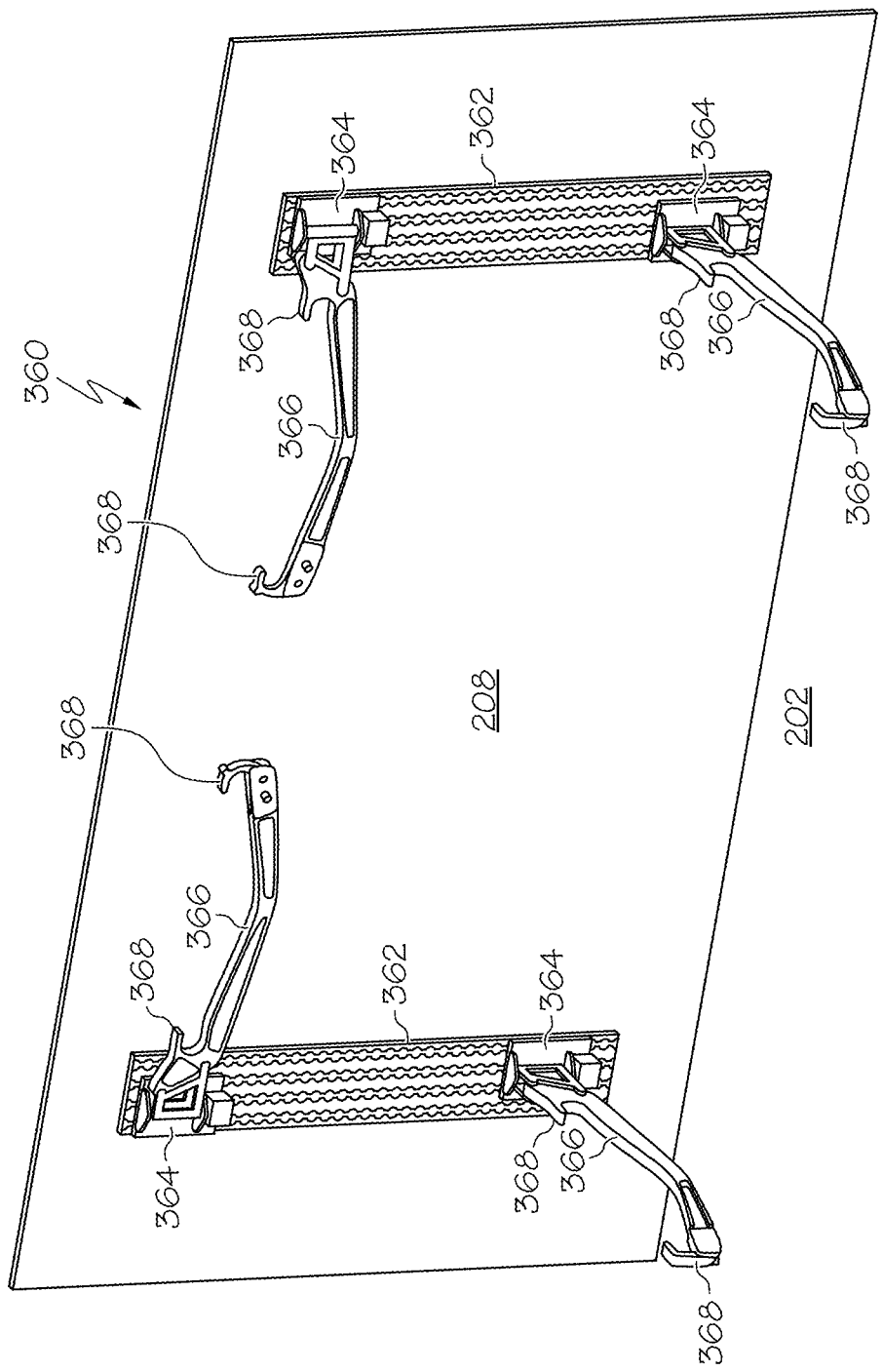
FIG. 9 depicts a partial cutaway side perspective view of an emergency vehicle patient transport system according to embodiments of the present disclosure.

In another embodiment, depicted in FIG. 9, the emergency vehicle transport system 10 comprises a mass casualty system 360 having a wall fixture 362 coupled to the wall 208. A pivoting attachment 364 is rotatably joined with the wall fixture 362 and coupled to a rotating arm 366. Clasping mechanisms 368 are disposed at both ends of the rotating arm 366, and removably secure a portion of a cot. The rotating arm 366 provides a collapsible fixture for holding additional cots in the emergency vehicle 200. For example, two additional cots may be transported by coupling two wall fixtures 362 to the wall 208. Each of the wall fixtures 362 are rotatably joined with two rotating arms 366. The four rotating arms 366 secure two cots when fully extended by holding the horizontal supports of a cot in the clasping mechanism. Thus, the cots may be disposed one above the other for secure transport. Furthermore, when the additional capacity is unneeded, the rotating arms 366 are stored against the wall 208.

Referring now to FIGS. 2, 3A, 4A and 4D, additional embodiments of emergency vehicle patient transport systems comprise an easy-removal mechanism to allow the chair 100, or components thereof, to be removed. For example, the pivot junction 170, seat junction 182, upper frame junction 132 and channel pivot member 306 may comprise a pin such as, for example, a ball lock pin, a hitch pin, a linch pin, a safety pin, and the like for rapid disassembly. In one embodiment, the bottom absorption member 174 (FIG. 2) comprises a release actuator which, when activated, separates the bottom absorption member 174 into multiple components. The seat 131 is removed by separating the bottom absorption member 174 and removing a pin from the pivot junction 170. In another embodiment, the lower chair junction 138 (FIG. 4A) comprises a threaded knob which, when removed frees the seat 131 from the lower arm 140. The seat 131 is removed by removing the threaded knob and removing a pin from the upper frame junction. In a further embodiment, the channel stop 304 (FIG. 4D) is removable, for example via screws or locking clasps. The chair 100 is disassembled by removing the channel stop 304 and removing a pin from the channel pivot member 306. In still further embodiments, the chair 100 may be removed from the vehicle by disengaging from the tracks 210, by for example an easy removal mechanism within the tracks 210 or the translation members 110 and 120.

It is further noted that terms like "preferably," "generally", "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A fastening system for an emergency vehicle patient transport system, the emergency vehicle patient transport system having two components located in the transport bay of the emergency vehicle patient transport system, the fastening system comprising:
    an absorption member connected between the two components, wherein one of the two components is in movable relation to the other via the absorption member, and
    a sensor which triggers a locking in place of one of the components in response to a sensed crash event.

2. The fastening system of claim 1, wherein one of the two components comprises a floor translation member.

3. The fastening system of claim 1, further comprising the two components, the two components comprising:
    an emergency vehicle patient transport system,
    and wherein the sensor is located on the emergency vehicle patient transport system.

4. The fastening system of claim 1, wherein one of the two components comprises:
    a vertical member.

5. The fastening system of claim 1, wherein one of the two components comprises a ceiling translation member.

6. The fastening system of claim 1, wherein one of the two components comprises a chair.

7. The fastening system of claim 1, wherein one of the two components comprises a seat.

8. The fastening system of claim 1, wherein the sensor includes a first state and a second state, the first state indicating no crash event or a crash event of a magnitude less than a designated magnitude, and the second state indicative of a crash event of a magnitude exceeding the designated magnitude of impact.

9. The fastening system of claim 1, wherein the absorption member is selected from the group consisting of: a shock, a strut, a spring, a piezoelectric component, a rubber bumper, and a crumple pad.

10. A method of indicating a crash event on an emergency vehicle patient transport system, the emergency vehicle patient transport system having two components located in the transport bay of the emergency vehicle patient transport system, the method comprising:
    locating an absorption member connected between the two components, wherein one of the two components is in movable relation to the other via the absorption member;
    configuring a sensor to determine the intensity of the crash event during or after the crash event;
    indicating the intensity of the crash event with the sensor when the absorption member is subject to the crash event; and
    locking in place of one of the components based on the intensity of the sensed crash event triggered by the sensor.

11. The method of claim 10, wherein the sensor which indicates the intensity of the crash is an accelerometer or transducer.

* * * * *